(12) United States Patent
Boudreau

(10) Patent No.: US 7,312,184 B2
(45) Date of Patent: Dec. 25, 2007

(54) RECOVERY COMPOSITION AND METHOD

(76) Inventor: Edward L. Boudreau, 3727 Rio Viejo Dr., Bakersfield, CA (US) 93313

( * ) Notice: Subject to any disclaimer, the term of this patent is extended or adjusted under 35 U.S.C. 154(b) by 477 days.

(21) Appl. No.: 10/865,075

(22) Filed: Jun. 9, 2004

(65) Prior Publication Data

US 2004/0224854 A1 Nov. 11, 2004

Related U.S. Application Data

(62) Division of application No. 10/028,005, filed on Dec. 21, 2001, now Pat. No. 6,776,234.

(51) Int. Cl.
C09K 8/60 (2006.01)
B09C 1/00 (2006.01)
(52) U.S. Cl. .................. 507/267; 507/244; 166/270.2; 405/128.5
(58) Field of Classification Search ................ 507/138, 507/260, 267, 268
See application file for complete search history.

(56) References Cited

U.S. PATENT DOCUMENTS

| | | | |
|---|---|---|---|
| 2,238,671 A | 4/1941 | Woodhouse | |
| 2,721,174 A | 10/1955 | Brainerd, Jr. | |
| 2,927,639 A | 3/1960 | Schuessler et al. | |
| 3,163,214 A | 12/1964 | Csaszar | |
| 3,354,033 A | 11/1967 | Buckman et al. | |
| 3,696,040 A | 10/1972 | Mayo | |
| 3,817,330 A | 6/1974 | Christopher et al. | |
| 3,873,452 A | 3/1975 | Donham | |
| 4,064,942 A | 12/1977 | Prats | |
| 4,252,192 A | 2/1981 | Nussbaum et al. | |
| 4,371,444 A | 2/1983 | McCoy et al. | |
| 4,532,052 A | 7/1985 | Weaver et al. | |
| 4,556,107 A | 12/1985 | Duerksen et al. | |
| 4,556,495 A | 12/1985 | Shaw | |
| 4,793,414 A | 12/1988 | Nguyen et al. | |
| 4,817,713 A | 4/1989 | Nguyen et al. | |
| 4,825,951 A | 5/1989 | Balzer | |
| 4,934,457 A | 6/1990 | Wallender | |
| 4,958,684 A | 9/1990 | Nguyen et al. | |
| 4,964,615 A * | 10/1990 | Mueller et al. ............. | 507/243 |
| 4,966,235 A | 10/1990 | Gregoli et al. | |
| 4,967,837 A | 11/1990 | Danzik | |
| 5,014,787 A | 5/1991 | Duerksen | |
| 5,052,487 A | 10/1991 | Wall | |
| 5,110,487 A | 5/1992 | Current | |
| 5,131,471 A | 7/1992 | Duerksen et al. | |
| 5,188,178 A | 2/1993 | Noyes | |
| 5,193,618 A | 3/1993 | Loh et al. | |
| 5,201,815 A | 4/1993 | Hong et al. | |
| 5,234,054 A | 8/1993 | Chou | |
| 5,244,878 A | 9/1993 | Sugier et al. | |
| 5,273,682 A | 12/1993 | Danzik | |
| 5,618,780 A * | 4/1997 | Argillier et al. ............ | 508/503 |
| 5,773,390 A | 6/1998 | Salisbury et al. | |
| 5,797,456 A | 8/1998 | Mokadam | |
| 5,942,469 A | 8/1999 | Juprasert et al. | |
| 5,977,031 A * | 11/1999 | Patel ........................... | 507/138 |
| 6,173,776 B1 | 1/2001 | Furman et al. | |
| 6,218,342 B1 * | 4/2001 | Patel ........................... | 507/129 |
| 6,260,620 B1 | 7/2001 | Furman et al. | |
| 6,260,621 B1 | 7/2001 | Furman et al. | |
| 6,589,917 B2 * | 7/2003 | Patel et al. .................. | 507/138 |
| 6,593,279 B2 * | 7/2003 | Von Krosigk et al. ...... | 507/267 |
| 6,766,817 B2 | 7/2004 | da Silva | |
| 2001/0009890 A1 * | 7/2001 | Patel et al. .................. | 507/138 |

FOREIGN PATENT DOCUMENTS

WO WO 00/27945 5/2000

OTHER PUBLICATIONS

Akzo Nobel, Material Safety Data Sheet, Product Name: ARMOHIB® 31, pp. 1-5, printed Feb. 23, 2001.
Akzo Nobel, Material Safety Data Sheet, Product Name: ETHOMID® 0/17, pp. 1-5, printed Jan. 25, 2001.
Akzo Nobel, Material Safety Data Sheet, Product Name: ETHOMID® HT/23, pp. 1-5, printed Jan. 25, 2001.
Akzo Nobel, Material Safety Data Sheet, Product Name: ETHOFAT® 18/14, pp. 1-5, printed Jul. 23, 2001.
Akzo Nobel, Material Safety Data Sheet, Product Name: ARMOHIB® 28, pp. 1-7, printed May 8, 2001.
Soygold Marine Clean Formula, Soygold Marine Introduction, 2 pages, Nov. 27, 2001, http://www.soygold.com/marine-msds.htm.
BCI Products, BCI Drilling Mud Products for Water-Base Mud Systems, 11 pages, Dec. 18, 2001, http://www.bcidf.com/products.html.
Summary of Data for Chemical Selection, Nov. 28, 2001, 19 pages, http://ntp-server.niehs.nih.gov/htdocs/Chem_Background/ExsumPdf/MethylSoyate.pdf.
I. Structure and Properties of Lipids, Nov. 28, 2001, 21 pages, http://www.biochem.ubc.ca/coursematerials/303RSM-PtLipidStr.pdf.

* cited by examiner

Primary Examiner—Marc S. Zimmer
(74) Attorney, Agent, or Firm—Blakely Sokoloff Taylor & Zafman LLP

(57) ABSTRACT

A method and composition are described for improving recovery of oil from an oil reservoir. The method includes adding an effective amount of a fatty acid alkyl ester oil recovery composition to an oil reservoir and recovering oil from the reservoir. The composition may include in predominant proportion a fatty acid alkyl ester as well as effective concentrations of a surfactant, a colloid, and an acid. One exemplary composition includes 96% soy methyl ester, 3% surfactant, and 1% vinegar.

3 Claims, 20 Drawing Sheets

RECOVERY COMPOSITION AND METHOD

CROSS-REFERENCE TO RELATED APPLICATION

This application is a divisional of U.S. patent application Ser. No. 10/028,005, filed Dec. 21, 2001 now U.S. Pat. No. 6,776,234.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software and data as described below and in the drawings hereto: Copyright© 2001, All Rights Reserved.

BACKGROUND

1. Field of the Invention

The invention relates generally to a method and composition for, in one aspect, improving oil recovery from a reservoir. More particularly, the invention relates to composition including a fatty acid alkyl ester and methods for adding the composition to an oil reservoir to recover oil from the reservoir. Other uses are also contemplated.

2. Background Information

Crude oil or petroleum is a complex liquid mixture of hydrocarbons containing primarily carbon, hydrogen, and varying amounts of other atoms such as sulfur, nitrogen, oxygen, and others. Crude oil is recovered from subsurface oil reservoirs, wherein the oil is held within pores and voids of rock and sand, and then refined to produce a number of useful substances such as gasoline, lubricants and chemical building blocks.

FIG. 1 illustrates oil production well 110 recovering oil 130 from oil reservoir 120. Production well 110 includes a production line 125 that extends into a volume of the oil held between gas 140 at a top surface and water 150 at a bottom surface. Production well 110 is able to recover the oil from sand and rock that contains it due to pumping action of the well and native pressure of the oil within the reservoir.

Recovery of oil such as that shown in FIG. 1 is comparatively easy when the oil is light, has a low viscosity, the reservoir is full of oil, and the reservoir has a high pressure. However recovery of the oil becomes more challenging when these conditions are not met. For example, rather than light, the oil may be heavy viscous oil and/or the reservoir may be substantially depleted of oil so that the reservoir pressure has been reduced. In such situations, it may be more difficult to recover oil from the reservoir. This leaves much residual oil trapped within the reservoir as an unrecoverable resource.

FIG. 2 illustrates oil 230 wetting an outside surface of sand particles 210A-C and within two oil-filled pores 220A-B formed by the sand particles. Such oil wetting of sand may make substantial amounts of the reservoir oil difficult to recover due to strong attractions such as high surface tension forces and capillary forces holding them fixedly to such regions. It may be difficult to remove the oil from such regions by using pressure as the only driving force for removal. Additionally, when water is present external to the pores it may tend to hold the oil inside the pores.

Various enhanced oil recovery methods are known to improve oil recovery from a reservoir. FIG. 3 illustrates a steam flooding enhanced oil recover operation to improve oil recovery from a reservoir. Steam addition system 310 comprising a steam generator, a stack gas scrubber, piping, flow control elements, and a steam injection line is used to add or inject steam into oil reservoir 320. The steam heats the oil in the reservoir to reduce the viscosity of the oil and make it less resistive to flow (similarly to the way that honey or molasses flows better when heated). This may allow hot oil proximate sand particle surfaces and within pores to become sufficiently mobile relative to the sand that the oil can move toward oil production well 330 suction inlet and be recovered from the reservoir.

There are several problems associated with steam flooding. A first problem is channeling wherein steam added to the reservoir takes the path of least resistance to the oil production well by improving the recovery of the weakest attached and most available oil first. Once a route to the oil production well has been established further steam flooding has decreased effectiveness due to the easy bypass to the low pressure oil production well. A second problem with steam flooding is that it is less favorable for deep oil reservoirs with high pressures. This is partly due to the increased pressure and heating needs to make the steam suitable for the high reservoir pressures.

Accordingly, there is a need for an improved approach for improving oil recovery from a reservoir.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION

Terminology

Figure 1:
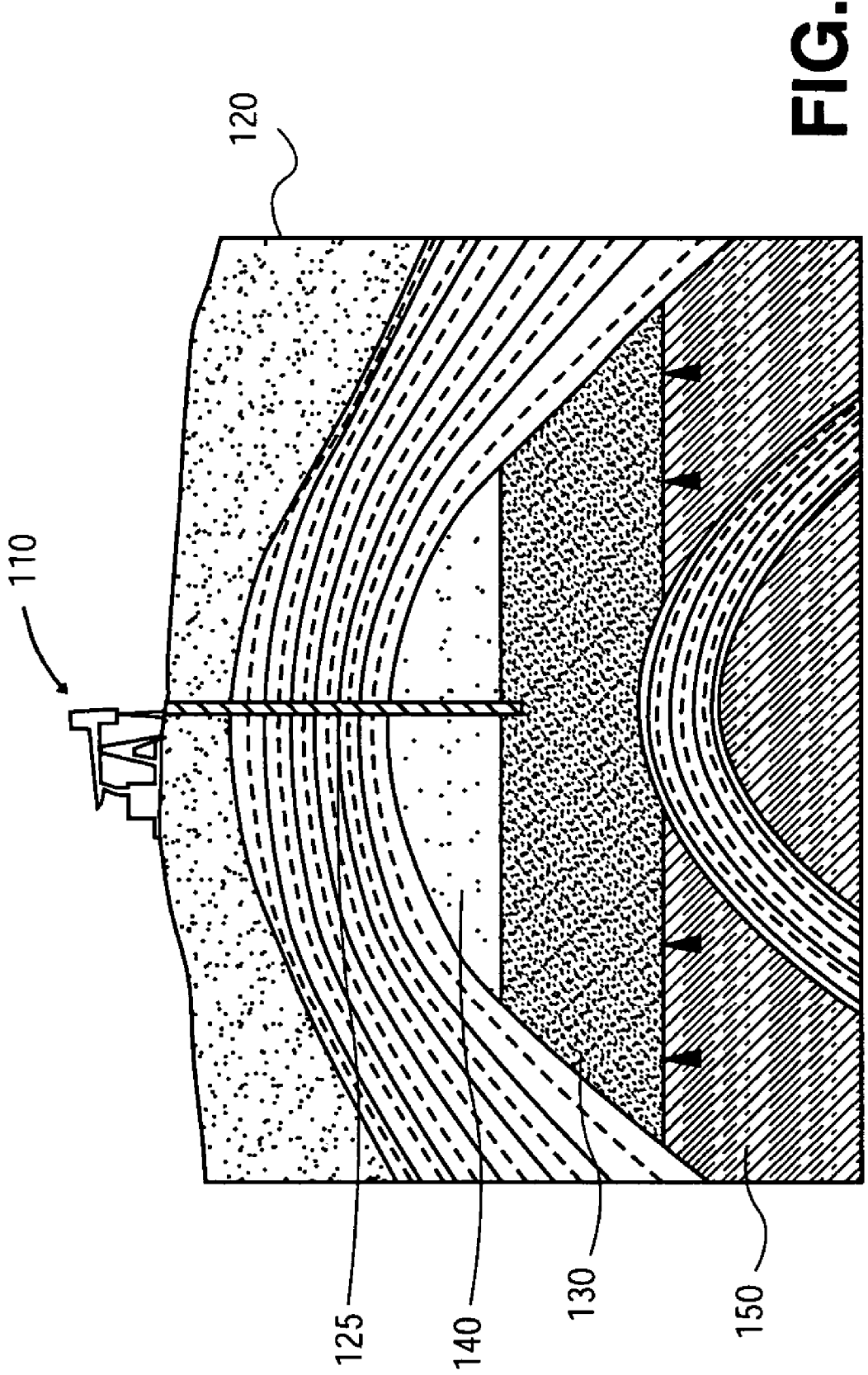
FIG. 1 illustrates an oil production well recovering oil from an oil reservoir.
Figure 2:
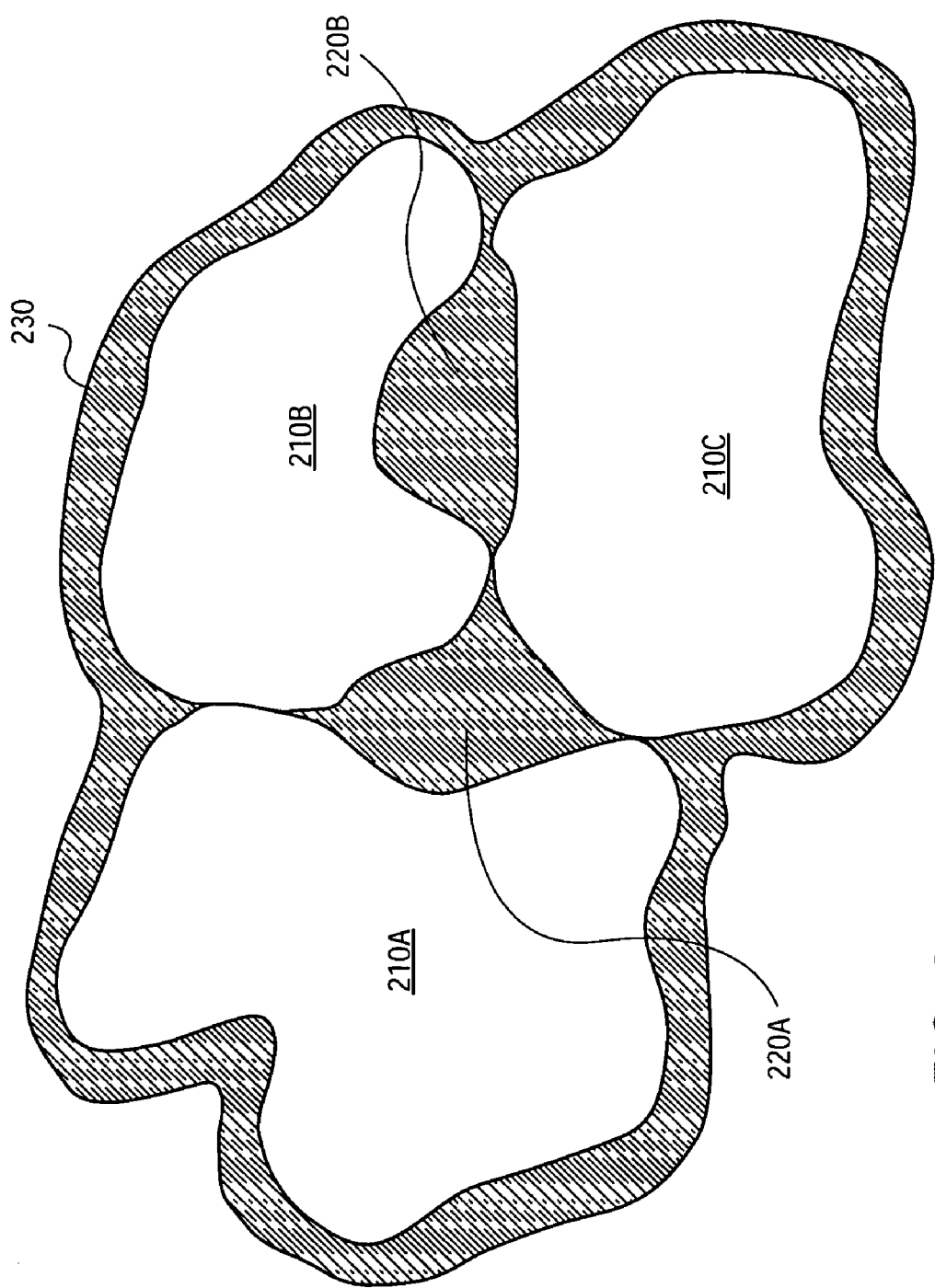
FIG. 2 illustrates difficult to recover oil.
Figure 3:
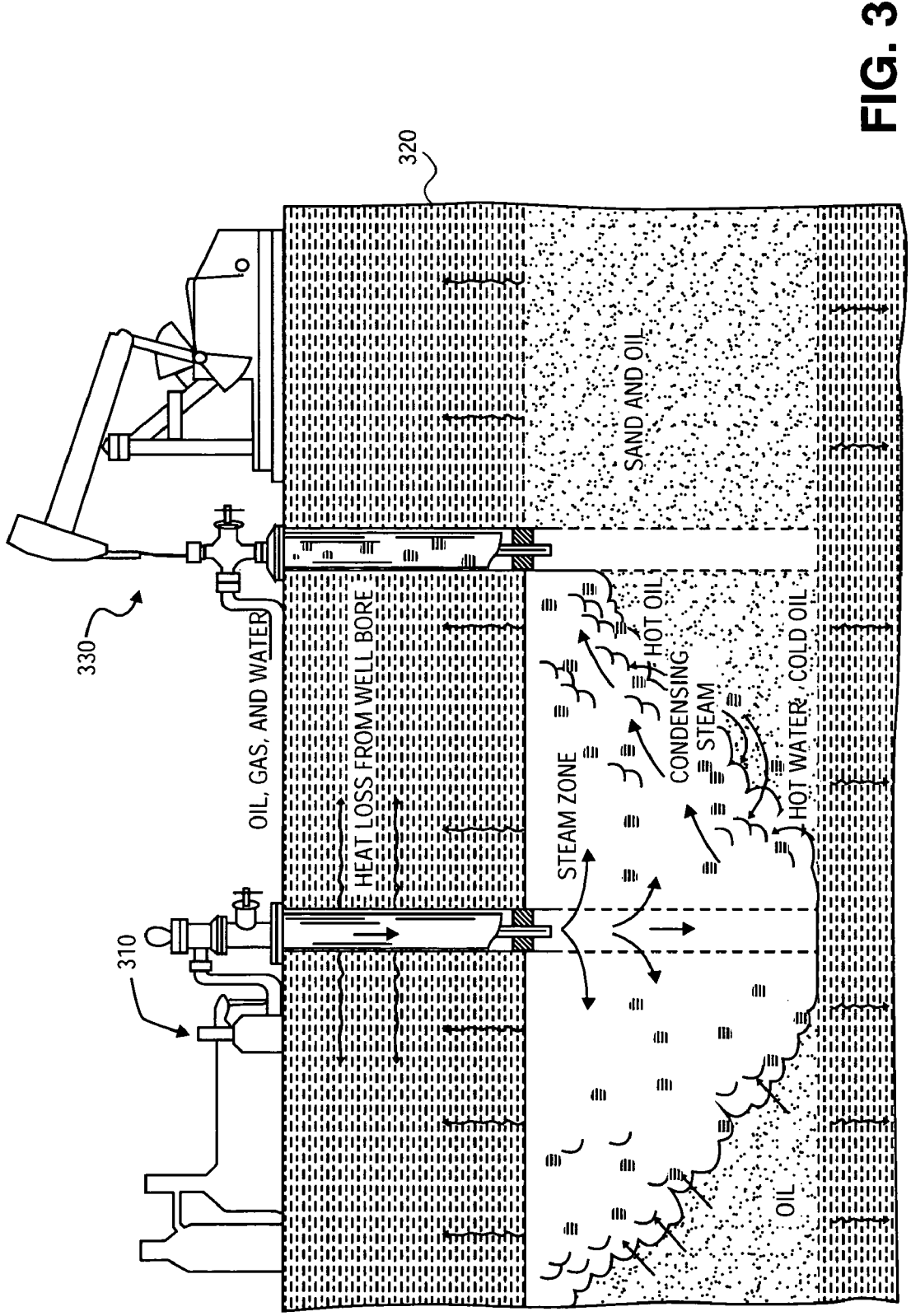
FIG. 3 illustrates a steam flooding enhanced oil recover operation to improve oil recovery from a reservoir.

Before providing a detailed explanation of the claimed subject matter and various exemplary embodiments thereof, some terms that will be used throughout this description are briefly defined as follows:

"Oil" refers to an arbitrarily complex organic liquid mixture of naturally occurring hydrocarbon and other components having arbitrary and widely varying properties such as viscosity, density, color, and composition.

"Reservoir" refers to a subsurface region that contains oil. The reservoir may include a geologic formation or trap of oil wherein the oil is contained within voids and pores of sand, rock, shale, and similar structures. The reservoir may be a terrestrial reservoir or an off-shore reservoir.

"Viscosity" refers to an oil's resistance to flow.

"Density" refers to mass of oil per unit volume. Both viscosity and density affect the ability to get oil to flow to a well bore of a production line and the ability to pump the oil within the line. A high viscosity, high density oil may be more difficult to recover than a low viscosity, low density oil partly because the oil may become trapped within voids in the reservoir and may be difficult to remove from these voids. By way of analogy, it is similarly more difficult to pour honey through a small opening than it would be to pour water through the same opening.

"Permeability" refers to the fluid transmitting measure of a sand or rock material of a reservoir.

"Mobility" refers to the ratio of permeability to viscosity.

Additionally, unless indicated otherwise percentages for compositions are percentage by volume. For example, a composition having 95 percent (%) fatty acid alkyl ester may have 95 gallons of fatty acid alkyl ester for every 100 gallons of the composition.

Oil Recovery Compositions

In one embodiment, a recovery composition is described. The recovery composition is suitable for introduction into a reservoir to improve the recovery of oil contained within the reservoir. In one embodiment, the recovery composition comprises at least one type of fatty acid alkyl ester. The recovery composition may contain a blend of different fatty acid alkyl esters. In the case of a blend, the different types of fatty acid alkyl esters may be in any proportion that is desired for the particular implementation.

Suitable fatty acid alkyl esters for a recovery composition may be represented by the general formula R'COOR wherein R' and R are typically different hydrocarbon groups containing carbon and hydrogen and potentially other components. For example, the groups may contain heteroatoms such as nitrogen, oxygen, sulfur, and others that may be found in organic compounds. The fatty acid alkyl ester may be an ester derived from a triglyceride. For example, the fatty acid alkyl ester may be a vegetable oil lower alkyl ester. The term "lower alkyl ester" refers to an alkyl ester having an R-group of between 1 and 5 carbons inclusive and preferably between 1 and 2 carbons inclusive. This may include such R-groups as methyl, ethyl, n-propyl, isopropyl, n-butyl, n-pentyl, and isopentyl. Preferably the R-group contains 1 or 2 carbons. For example, the fatty acid alkyl ester may comprise a soy methyl ester or a soy ethyl ester. The R'-group may comprise a carbon chain having between 4 and 22 carbons. Preferably the fatty acid alkyl ester is a "long-chain fatty acid alkyl ester" having an R'-group with between 12 and 20 carbons inclusive and preferably between 16 carbons or 18 carbons inclusive. The carbon chain may be saturated and contain no double bonds or be unsaturated and contain one or more double bonds. The fatty acid alkyl ester may comprise a mixture of sixteen carbon chain length methyl esters, seventeen carbon chain length methyl esters, and eighteen carbon chain length methyl esters. For example, the mixture may comprise a linoleic acid methyl ester, an oleic acid methyl ester, a stearic acid methyl ester, and a palmitic acid methyl ester.

Synthesis of Fatty Acid Alkyl Esters by Trans-esterification Of Triglycerides

One method for creating a fatty acid alkyl ester suitable for use in a recovery composition is trans-esterification of a plant or animal triglyceride. Triglycerides are oils or lipids that occur naturally in plants and animals. The triglycerides are esters generally characterized by having three molecules of fatty acids linked to glycerol. Different types of triglycerides are contemplated including those present in natural oils of plants, vegetables, corn, spent French-fry oil, olive, palm, coconut, oleaginous seeds, soybean, rapeseed, sunflower, canola, safflower, animals, animal tallow, butter, milk, and others. Table 1 shows approximate fatty acid concentrations in triglycerides from exemplary plant and animal sources.

TABLE 1

Fatty Acids In Naturally Occurring Substances

| Triglyceride Source | Lauric[a] & Myristic[b] | Palmitic[c] | Stearic[d] | Oleic[e] | Linoleic[f] |
|---|---|---|---|---|---|
| Coconut | 74 | 10 | 2 | 7 | — |
| Corn | — | 8-12 | 3-4 | 19-49 | 34-62 |
| Olive | — | 9 | 2 | 84 | 4 |
| Palm | — | 39 | 4 | 40 | 8 |
| Safflower | — | 6 | 3 | 13 | 78 |
| Soybean | — | 9 | 6 | 20 | 52 |
| Sunflower | — | 6 | 1 | 21 | 66 |
| Beef | 5 | 24-32 | 20-25 | 37-43 | 2-3 |
| Milk | — | 25 | 12 | 33 | 3 |

[a]n-Dodecanoic acid, $CH_3(CH_2)_{10}COOH$, 12:0
[b]n-Tetradecanoic acid, $CH_3(CH_2)_{12}COOH$, 14:0
[c]n-Hexadecanoic acid, $CH_3(CH_2)_{14}COOH$, 16:0
[d]n-Octadecanoic acid, $CH_3(CH_2)_{16}COOH$, 18:0
[e]cis-9-Hexadecenoic acid, $18:1(\Delta^9)$
[f]cis,cis-9,12 Octadecadieoic acid, $18:2(\Delta^{9,12})$ Taking soybean oil as an example, soybean oil triglycerides contain a mixture of fatty acids having either 16 or 18 carbons and generally contain, in largest proportion, unsaturated 18 length carbon chains.

Trans-esterification is the process of reacting a triglyceride with an alcohol in the presence of a catalyst to produce an ester and glycerol. For example, soy oil may be trans-esterified with methanol in the presence of a suitable base catalyst such as potassium hydroxide to produce soy derived fatty acid methyl esters plus glycerol as follows:

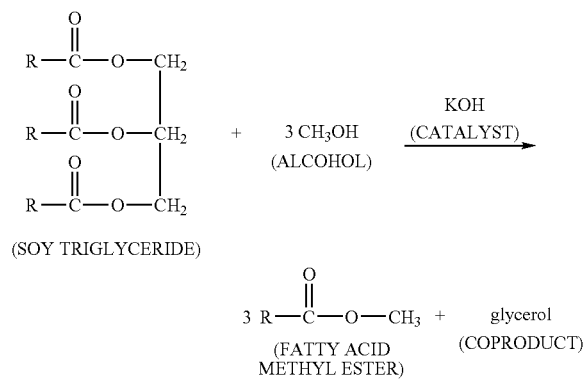

The esters may be recovered from the lighter liquid phase and purified as desired.

Certain fatty acid alkyl esters are commercially available. For example, soy methyl ester, which belongs to the fatty acid alkyl ester structural class, is commercially available from a number of sources including AG Environmental Products LLC (AEP) of Lenexa, Kans. who offer soy methyl ester under the tradename Soygold® Marine. Soy methyl ester is also known as methyl soyate and biodiesel. Soy methyl ester has been assigned CAS Registry Number 67784-80-9. The Soygold® Marine product comprises in significant proportion C16-C18 fatty acid methyl esters that are derived from soybean oil. Saturated fatty acid methyl esters contained in significant proportion in methyl soyate are methyl esters of lauric acid, palmitic acid, and stearic acid. Unsaturated fatty acid methyl esters contained in significant proportion in methyl soyate are methyl esters of oleic acid, linoleic acid, and linolenic acid. The product is a light yellow colored liquid that has a melting point of about −10° C. (a liquid at room temperature), a normal boiling point greater than 200° C. (typically 315° C.), a vapor pressure typically less than about two millimeters mercury (mmHg) (non-volatile), a specific gravity of about 0.88 g/ml (lighter than water), and very low solubility in water at room temperature.

In addition to a fatty acid alkyl ester, one embodiment of a suitable recovery composition that may be used to improve oil recovery from a reservoir also includes a surfactant 520, a colloid, an acid 530, or some combination. In one embodiment, the concentration of the fatty acid alkyl ester may be between about 85% and about 99.89% or preferably between about 94% and about 98.99%. In this embodiment, the concentration of the surfactant may be between about 0.1% and about 10% or preferably between about 1% and about 5%. Finally, the concentration of the acid may be between about 0.01% and about 5% or preferably between about 0.01% and about 1%. For example, an exemplary concentration may comprise 96% soy methyl ester, 3% F-500™ surfactant (which will be discussed more fully below), and 1% vinegar (more than 4 percent aqueous solution of acetic acid).

Suitable surfactants for use in a recovery composition may be any surface active or interfacial agent that gets absorbed at an interface and changes the properties of the interface. For example, the surfactant may be an interfacial tension reducing agent that reduces the interfacial tension of a medium when it is added to the medium.

Suitable surfactants may be selected from the group including but not limited to an amphipathic surfactants, anionic surfactant, cationic surfactants, detergents, and soaps. The surfactant may be soluble in the fatty acid alkyl ester composition. The surfactant may be thermally stable at reservoir conditions of temperature, pressure, salinity, and pH. The surfactant may also be comparatively non-toxic. The surfactant may be an amphipathic surfactant having both lyophilic and lyophobic groups. The surfactant may comprise a hydrophobe portion that prefers oil to water and a hydrophile portion that prefers water to oil. The surfactant may be an anionic surfactant that dissociates to yield a surfactant ion whose polar group is negatively charged. Exemplary anionic surfactants include sulfate surfactants (e.g., petroleum sulfates, alkyl sulfates, aryl sulfates), sulfonate surfactants (e.g., petroleum sulfonates, alkyl sulfonates, aryl sulfonates), and others. The surfactant may also be a cationic surfactant that dissociates to yield a surfactant ion whose polar group is positively charged. Exemplary cationic surfactants include alkylpyridinium salts and quaternary ammonium salts. The surfactant may also be a detergent formulation that contains other components.

According to one embodiment, the surfactant may be the F-500™ surfactant. F-500™ Dyna-Drill Foamer is a surfactant and foaming additive that is available from BCI Products, of Houston, Tex. F-500™ comprises a composition comprising 2,2'2"-Nitrilotrisethanol aliphatic acid soap, fatty alkyl ethers reaction product with aliphatic acids, and linear aliphatic alcohols. This surfactant is commercially available, is comparatively non-toxic, is stable under and additionally may be useful to inhibit flammability of a material onto which it is applied.

According to another embodiment, the surfactant may be a soap made by treating a fatty acid with base to create a sodium or potassium salt of the fatty acid. For example, the surfactant may comprise a saponification product of a fatty acid similar to the fatty acid of the fatty acid alkyl ester. According to still another embodiment, the surfactant may comprise ARMOHIB® 31, ETHOMID® O/17, ETHOMID® HT/23, ETHOFAT® 18/24, ETHOFAT® 242/25, or ARMOHIB® 28, which are all available from Akzo Nobel Chemicals Ltd, of Arnhem the Netherlands, and having other places of business and sales offices. In particular, the surfactant may comprise a quaternary amine compound like ARMOHIB® 31, hydrogenated tallow amides like ETHOMID® HT/23, ethoxylated tall oil like ETHOFAT® 242/25, or fatty amines and alkoxylated fatty amines like ARMOHB® 28.

Depending upon the structure of the surfactant or mixture of surfactants selected, the surfactant may function as an emulsifier, dispersant, oil-wetter, water-wetter, foamer, defoamer or some combination to reduce interfacial tension and capillary forces of the oil within the voids. Surfactants may be costly such that the surfactant may be added to the composition in the smallest proportion that is found to be effective. Suitable surfactants are also preferably not diluted to any significant extent by water, since the water tends to settle out of the oil recovery composition. For example, the surfactant may come as a gel or similar highly viscous liquid.

The oil recovery composition may also include a colloid. The term "colloid" will be used to refer to a heterogeneous mixture of a liquid and sufficiently small solid particles. The solid particles may be large enough to scatter a light beam but too small to settle out by gravity. The solid particles may be highly concentrated. Different solid particles are contemplated including inorganic solid particles (e.g., clays), organic solid particles (e.g., starches, polymers, etc.). The solid particles may be less than about 2 microns in diameter. A micelle emulsion is also contemplated wherein the solid particles are replaced by fatty acid soap micelles. Suitable colloids are preferably not diluted with water. The colloid may tend to disperse upon application and therefore aid in the distribution and in particular the lateral distribution of an oil recovery composition through an oil reservoir. For example, the colloid may react with water in a water table to draw the composition into and laterally through the water table from where it may percolate up into the oil reservoir. Accordingly, adding the colloid may encourage improved distribution of the composition within an oil reservoir. One colloid that is contemplated is the TWC210™ colloid, which is commercially available from the Ward Companies of Garden Grove, Calif.

Different colloid concentrations are contemplated for oil recovery. In one embodiment, a colloid-containing oil recovery composition may have a concentration of the fatty acid alkyl ester may be between about 65% and about 98.89% or preferably between about 78% and about 93.99%. In this embodiment, the concentration of the surfactant may be between about 0.1% and about 10% or preferably between about 1% and about 5%. The concentration of the colloid may be between about 1% and about 20% or preferably between about 5% and about 16%. Finally, the concentration of the acid may be between about 0.01% and about 5% or preferably between about 0.01% and about 1%. One contemplated colloid-containing oil recovery composition includes about 90% soy methyl ester, about 5% TWC210colloid, about 3% essentially undiluted F-500™ surfactant, and about 2% vinegar (dilute acetic acid solution). Another contemplated colloid-containing oil recovery composition includes about 80% soy methyl ester, about 16% TWC210 colloid, about 2% essentially undiluted F-500™ surfactant, and about 2% vinegar.

The colloid may be provided in addition to the surfactant, as a partial replacement or substitute for the surfactant, or as a complete replacement of the surfactant in the recovery composition. In one embodiment each amount of surfactant is substituted or replaced by multiple amounts of a colloid. For example, each 1% reduction in surfactant concentration may be accompanied by between about a 1% to 10% or about a 3% to 8% increase in colloid concentration.

An acid may be added to the oil recovery composition to aid in suspension of the surfactant, the colloids, or both the surfactant and the colloid in the fatty acid alkyl ester. Suitable acids for the recovery composition may comprise weak acids that do not completely disassociate in water, strong acids that essentially completely dissociate in water, or both a weak acid and a strong acid. Weak acids that are contemplated include an organic acid, carboxylic acid, acetic acid, vinegar comprising about 5% acetic acid in water, formic acid, citric acid, lemon juice, butyric acid, benzoic acid, carbonic acid. Preferably the acid comprises acetic acid in the form of vinegar. Strong acids that are contemplated include an inorganic acid, a mineral acid, sulfuric acid, hydrochloric acid, nitric acid, perchloric acid, and others.

Preparation of the composition may include adding desired proportions of the surfactant and/or the colloid, and the acid to the fatty acid alkyl ester followed by mixing as desired. In one embodiment, it may be desirable to vigorously mix the composition sufficient to emulsify the acid, which may include an aqueous solution of acid such as vinegar, into the fatty acid alkyl ester, to avoid rapid phase separation, which may decrease the effectiveness of the composition.

Adding Compositions to Oil Reservoirs to Aid Recovery

Figure 4:
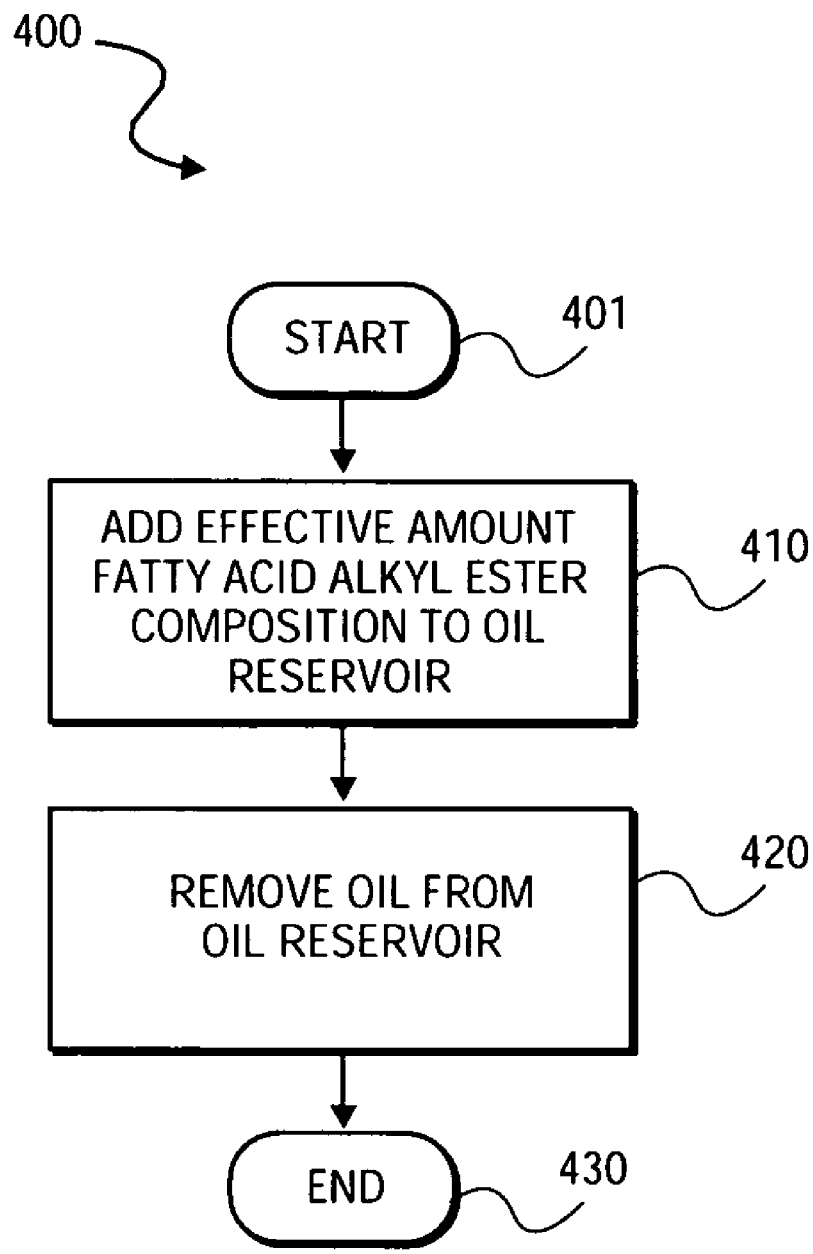
FIG. 4 illustrates a process flow for adding a recovery composition to an oil reservoir and then removing oil from the reservoir.

The compositions described above are effective for improving recovery of oil from reservoirs. FIG. 4 illustrates a method 400 for recovering or removing oil from an oil reservoir, according to one embodiment.

The method commences at block 401, and then proceeds to block 410, where an effective amount of a recovery composition such as described above is added to an oil reservoir. This may include adding between about 300 gallons and about 3,000 gallons or between about 500 gallons and 1500 gallons per well of a recovery composition. As described above, the composition may contain the fatty acid alkyl ester (e.g., a vegetable derived fatty acid methyl ester) at a concentration between about 85% and about 99.89%, a surfactant at a concentration between about 0.1% and about 10% (e.g., F-500), and an acid at a concentration between about 0.01% and about 5% (e.g., acetic acid or citric acid). Alternatively, the composition may be another composition described herein or one that would be apparent to a person having an ordinary level of skill in the art and the benefit of the present disclosure.

The recovery composition may affect the oil in the reservoir and in particular may make it easier to recover the oil from the reservoir. It is believed the recovery composition reduces attractions between the oil and the oil containing structures, such as surface tensions, capillary attractions, and physical or chemical bonds between oil and sand. This may make the oil more mobile relative to the sand and rock.

The method advances from block 410 to block 420 where oil is removed from the oil reservoir. Advantageously, as a result of the recovery composition being introduced, it may be possible to remove more oil for a longer period of time than would have been possible if the recovery composition had not been applied. Experimental studies have demonstrated increased oil production for several weeks and even several months at which time the reservoir may be re-treated with the recovery composition. The recovery composition described herein is particularly effective in this regard in comparison to prior art surfactant of acid stimulants, because it is believed the recovery composition tends to disperse out into the reservoir with the same effect more effectively than prior art composition. Additional advantages include the fact that the composition is benign relative to production and refining and does not need to be removed from the recovered oil prior to refining. In fact, the composition may aid in cleaning or defouling production and refining lines. Additionally, since some fatty acid alkyl esters such as soy methyl ester may be added as a diesel additive, the composition may be recovered during refining to serve a second purpose as an additive and thereby provide both an enhanced oil recovery benefit and also serve as an additive to refining products. The method terminates at block 430.

Figure 5:
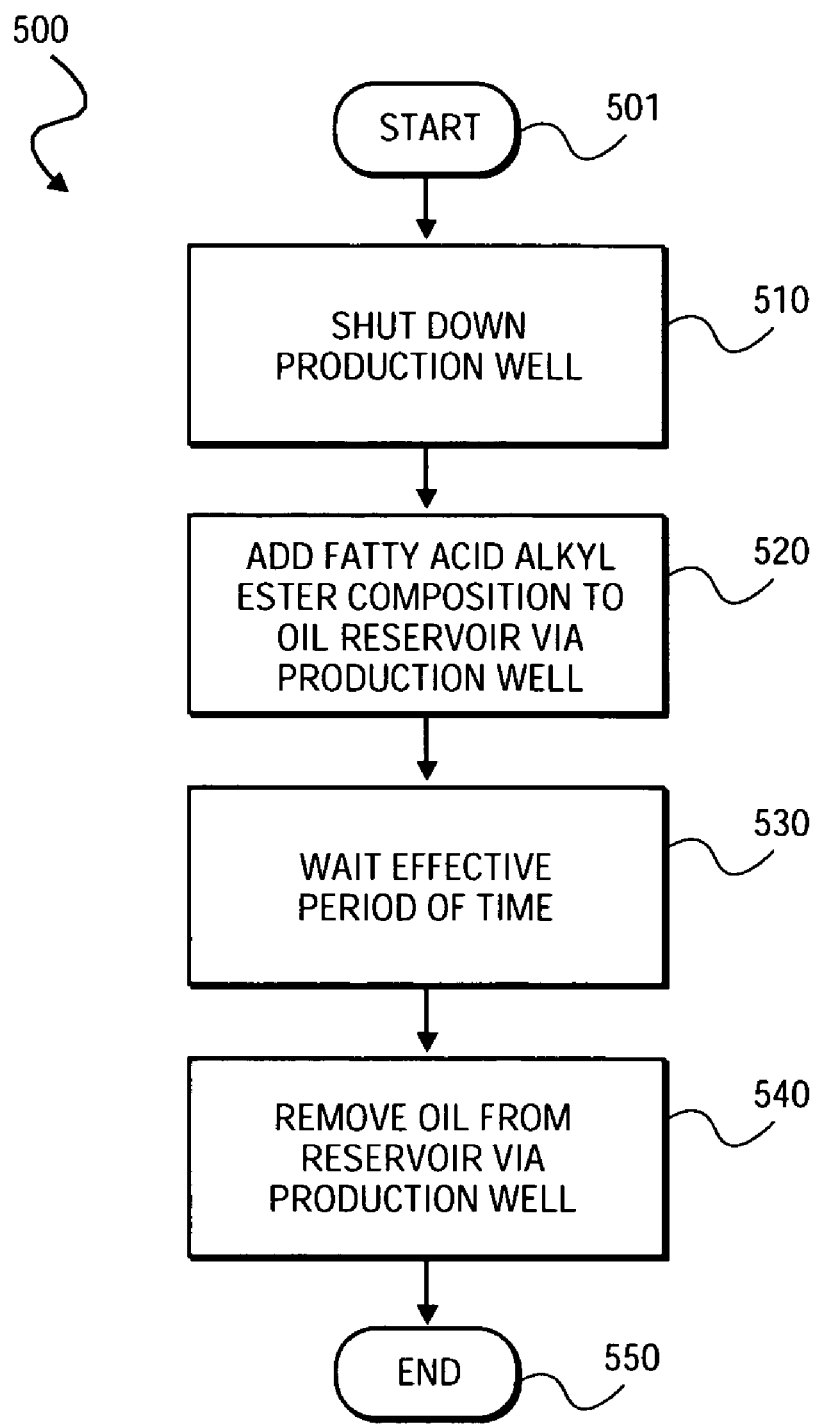
FIG. 5 illustrates a process flow for adding a recovery composition to a production well and then removing oil through the well.
Figure 6:
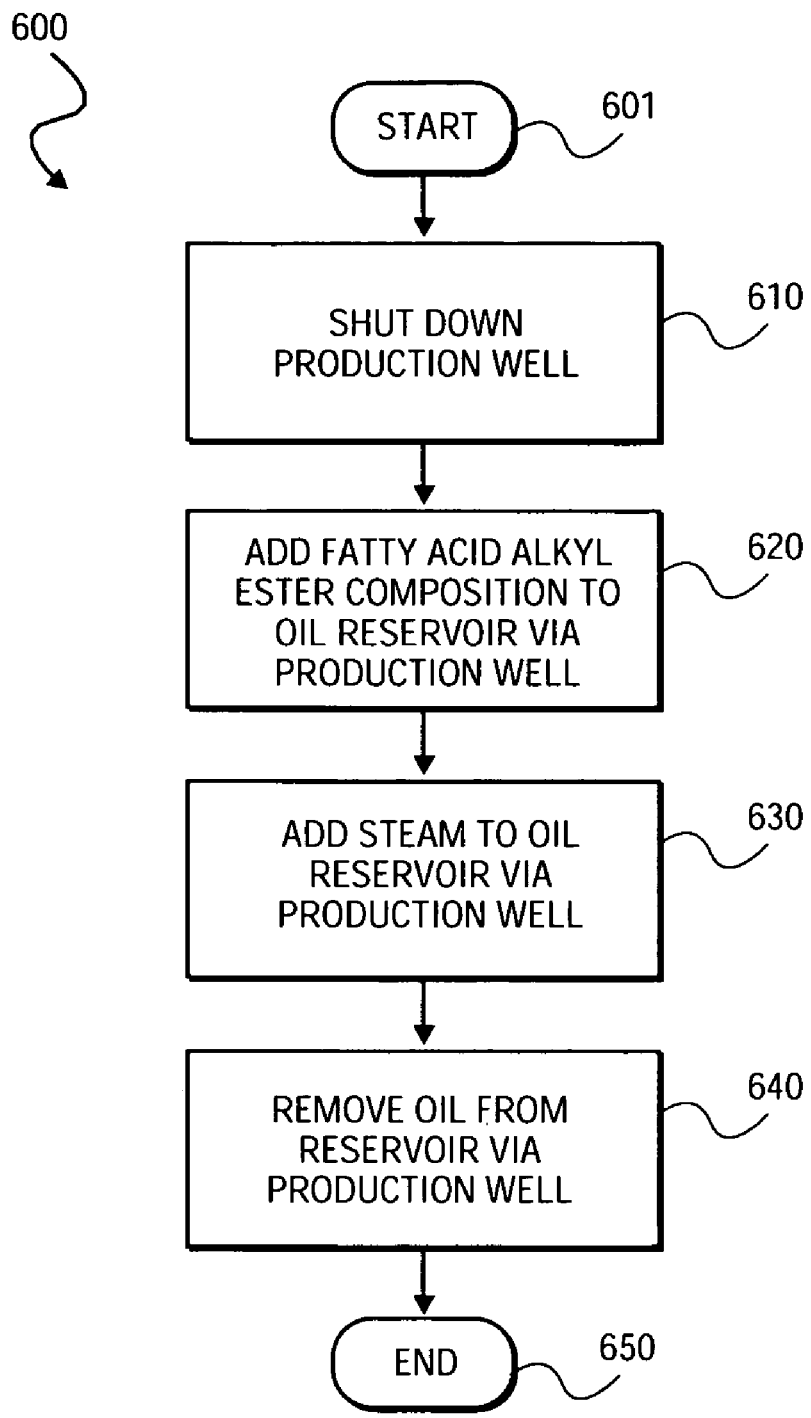
FIG. 6 illustrates a process flow for adding a recovery composition to a production well and using steam flooding.
Figure 7:
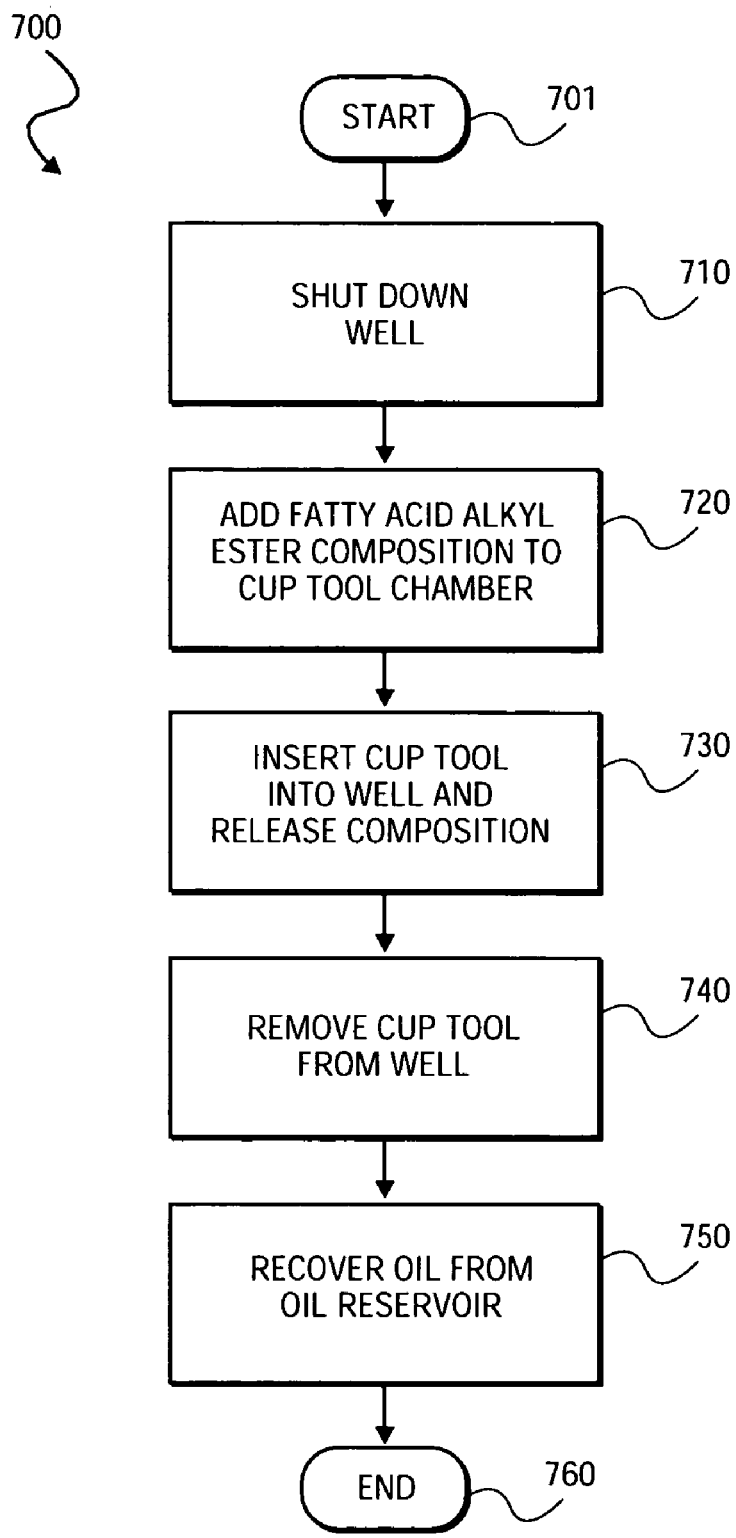
FIG. 7 illustrates a process flow for adding a recovery composition according to a cup tool method.
Figure 8:
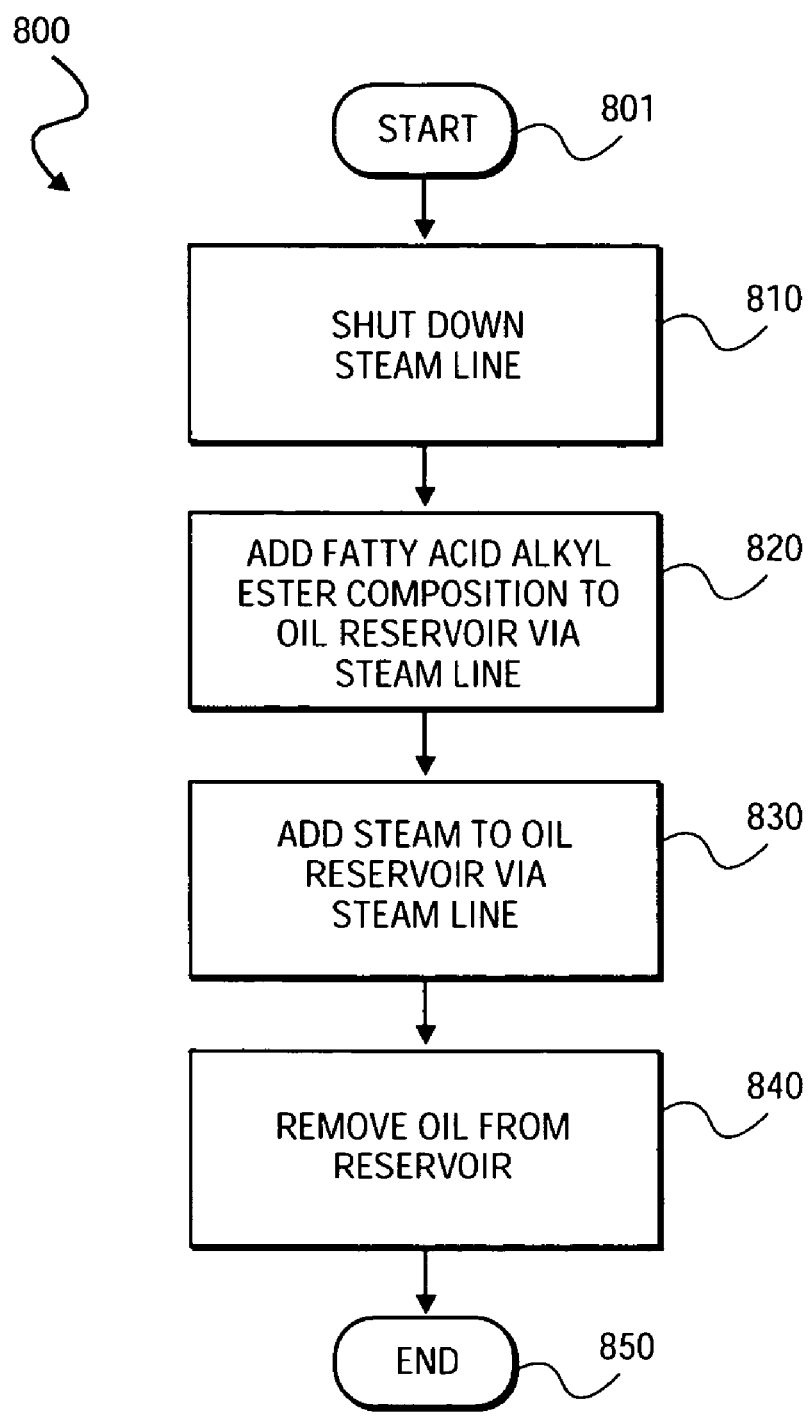
FIG. 8 illustrates a process flow for adding a recovery composition to a steam well.

Different methods presented below are contemplated for implementing the addition of recovery compositions as a liquid (or in a substantially liquid state) to oil reservoirs. FIG. 5 illustrates a first embodiment wherein the composition is added via a production well. This embodiment may be useful when a steam line is not present and, in addition to improving oil recovery from the well, may assist in cleaning the production well, associated piping, and a region of the reservoir proximate the production well suction zone. FIG. 6 illustrates a second embodiment wherein the composition is added to a production well and then steam is added to the production well. The steam may assist with distributing the composition to the reservoir, speeding the affect of the composition by decreasing viscosity, and thermally stimulating the oil and composition near the production line. FIG. 7 illustrates a third embodiment wherein the composition is added to a well via a cup tool. This embodiment may be useful when the well becomes clogged or fouled and when the oil reservoir has a high water aquifer. FIG. 8 illustrates a fourth method wherein the composition is added via a steam line associated with a production well or wells. This embodiment may be useful for reducing viscosity and increasing mobility of heavy oils and may additionally assist with cleaning the steam well. Other methods are contemplated.

Adding Compositions to Production Wells

FIG. 5 illustrates a method 500 for recovering or removing oil from an oil reservoir by adding a recovery composition such as described above to a production well, according to one embodiment. The method commences at block 501, and then proceeds to block 510, where a production well is shut down. After shutting down the production well, at block 520 a recovery composition such as described above is added to the oil reservoir by way of the production well (e.g., added down the casing and preferably down the tubing within the casing). The method advances from block 520 to block 530 where the recovery composition is allowed to take affect on the reservoir for a period between about one day and about seven days. After the recovery composition has taken the desired affect on the reservoir at block 540 the production well is started up again and oil is removed from the oil reservoir. The method terminates at block 550.

Adding Compositions to Production Wells with Steam Injection

FIG. 6 illustrates a method 600 for recovering or removing oil from an oil reservoir by adding a recovery composition such as described above to a production well, according to another embodiment. The method commences at block 601, and then proceeds to block 610, where the production well is shut down. After the production well has been shut down, at block 620 a recovery composition is added to the oil reservoir by way of the production well. The recovery composition may be added down the casing or preferably down the tubing.

The method advances from block 620 to block 630 where an effective amount of steam is added to the oil reservoir by way of the production well. The effective amount may be an amount sufficient to flush the composition from the line into the reservoir and assist with dispersing the composition into the reservoir. A larger effective amount may also be used to thermally stimulate the oil within the reservoir by heating it to reduce its viscosity. Both of these amounts may depend upon the particular characteristics of the oil field including depth and the oil including viscosity. Accordingly, the amount of steam added may vary from a trivial amount sufficient to flush the line and disperse the composition from the line into the reservoir to a larger conventional amount to thermally stimulate the reservoir. Similarly, characteristics of the steam such as pressure and temperature may vary depending upon depth according to convention.

After the desired amount of steam has been added the steam addition may be stopped so that oil recovery may begin. The method advances from block 630 to block 640 where the production well is started up and oil is removed from the oil reservoir. The method terminates at block 650.

Adding Compositions Via Cup Tool

FIG. 7 illustrates a method 700 for recovering oil from an oil reservoir by adding a recovery composition such as described above to a well with a cup tool, according to one embodiment. The method commences at block 701, and then proceeds to block 710, where a well is shut down. After the well has been shut down, at block 1020 a predetermined volume of a recovery composition is added to a cavity or chamber of the cup tool. The method advances from block 720 to block 730 where the cup tool is inserted into the well and the composition is released from the chamber. This may include inserting the cup tool chamber into proximate alignment with perforations in a perforated lining of the well and pressurized blowing the composition from the chamber with sufficient force to inject the composition into the reservoir and to remove oil structures that clog the lining at a particular perforation. Advantageously, the cup tool may assist with targeted distribution and dispersal of the composition and may additionally assist with cleaning deposits from the well. After releasing the composition, at block 740 the cup tool is removed from the well. The method advances from block 740 to block 750 where oil is recovered from the oil reservoir. The method terminates at block 760.

Adding Compositions to Steam Lines

FIG. 8 illustrates a method 800 for recovering or removing oil from an oil reservoir by adding a recovery composition such as described above to a steam line, according to one embodiment. The method commences at block 801, and then proceeds to block 810, where the steam line is shut down. After the steam line has been shut down, at block 820 a recovery composition is added to the oil reservoir by way of the steam line. The method advances from block 820 to block 830 where steam is added to the oil reservoir by way of the steam line to increase the effectiveness of the recovery composition at oil recovery. After adding an effective amount of the steam, at block 840 oil is removed from the oil reservoir. As desired, oil may be continuously recovered from the reservoir concurrently with addition of recovery composition at block 820, addition of steam at block 830, or both. The method terminates at block 850.

An additional advantage with injecting a recovery composition such as described above is steam well cleaning. Conventionally such steam wells are known to foul with hydrocarbons. This may cause flow restriction or steam dispersal and may limit the amount of steam that can be effectively delivered to the reservoir. One prior art approach for remedying this problem is to inject strong acids into the steam well to remove the hydrocarbons. However this approach has the disadvantage of introducing foreign acids into the oil which may cause corrosion of subsequent petroleum refining equipment or which may need to be separated from the oil prior to the petroleum refining processing. Accordingly, cleaning with fatty acid alkyl compositions, which do not cause corrosion during refining, provides an attractive alternative approach. Advantageously, this may allow both cleaning or defouling of the steam well, which may make steam stimulation more effective, as well as concurrently providing the composition to the reservoir to enhance oil recovery. This approach may additionally clean other processing equipment such as pumps that pump the oil from the reservoir and piping which may both be fouled by oil components such as paraffins.

Other Methods are Contemplated

Those having an ordinary level of skill in the art and the benefit of the disclosure will appreciate that other methods for adding recovery compositions such as described above to oil reservoirs are contemplated. For example, according to yet another method, a recovery composition may be added via a water injection well and then chased with water. The chase water may be provided in amount sufficient to disperse the composition as well as pressurize the well and mobilize the oil. Still another method includes adding a sufficient amount of the recovery composition as part of a fracing procedure (e.g., prior to pressurizing).

Detailed Working Example

Figure 9:
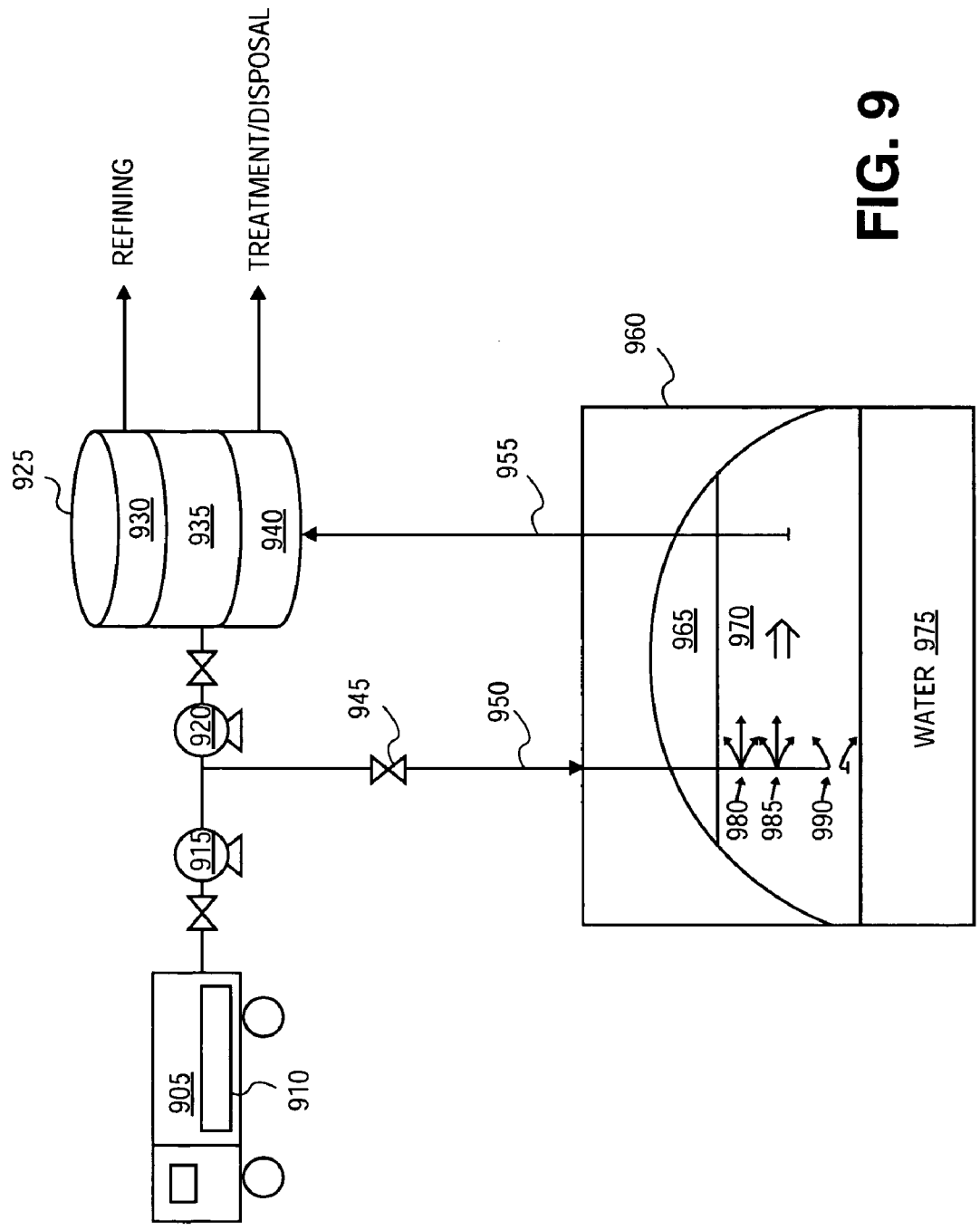
FIG. 9 illustrates a schematic diagram for adding a recovery composition to an injection well.

FIG. 9 illustrates an example application of a soy methyl ester oil recovery composition to an oil reservoir, according to one embodiment. Initially a scrapper tool is inserted into an injection well 950 to open and clear the injection well. Then the scrapper tool is removed and an injection tool is inserted into the injection well. Water 935 from a separation tank 925 is added to the reservoir 960 via a pump 920. A check valve 945 opens when the pump discharge reaches about 200 psi. This valve may essentially suppress flow from the reservoir. Recovery composition 910 may be added to the injection well from a tanker truck 905 via a pump 915. This may include adding about, 100 gallons or more (e.g., as much as 500 gallons or more) of recovery composition to the reservoir. Then water 935 may be added to push the recovery composition out of the well and into the oil reservoir as shown at 980. This may include adding between about 1 and about 50 times as much water as recovery composition, or more. Generally, the more water available for addition the better since the water aids in dispersing the composition into the reservoir by force of injection, percolation, and other mechanisms. Other segments may be added and these steps repeated as shown at 985 and 990 to vertically disperse the recovery composition along the oil reservoir. In one embodiment, a plurality of segments each having a length between about 10 and about 50 feet are used to disperse the recovery composition over a substantial portion of the oil containing regions 970 of the reservoir. Advantageously, the recovery composition tends to improve recovery of the oil by weakening attachments between the oil and oil containing structures (e.g., sand, rock, shale, etc.).

Conceptualized Representation of Improved Oil Recovery

Figure 10:
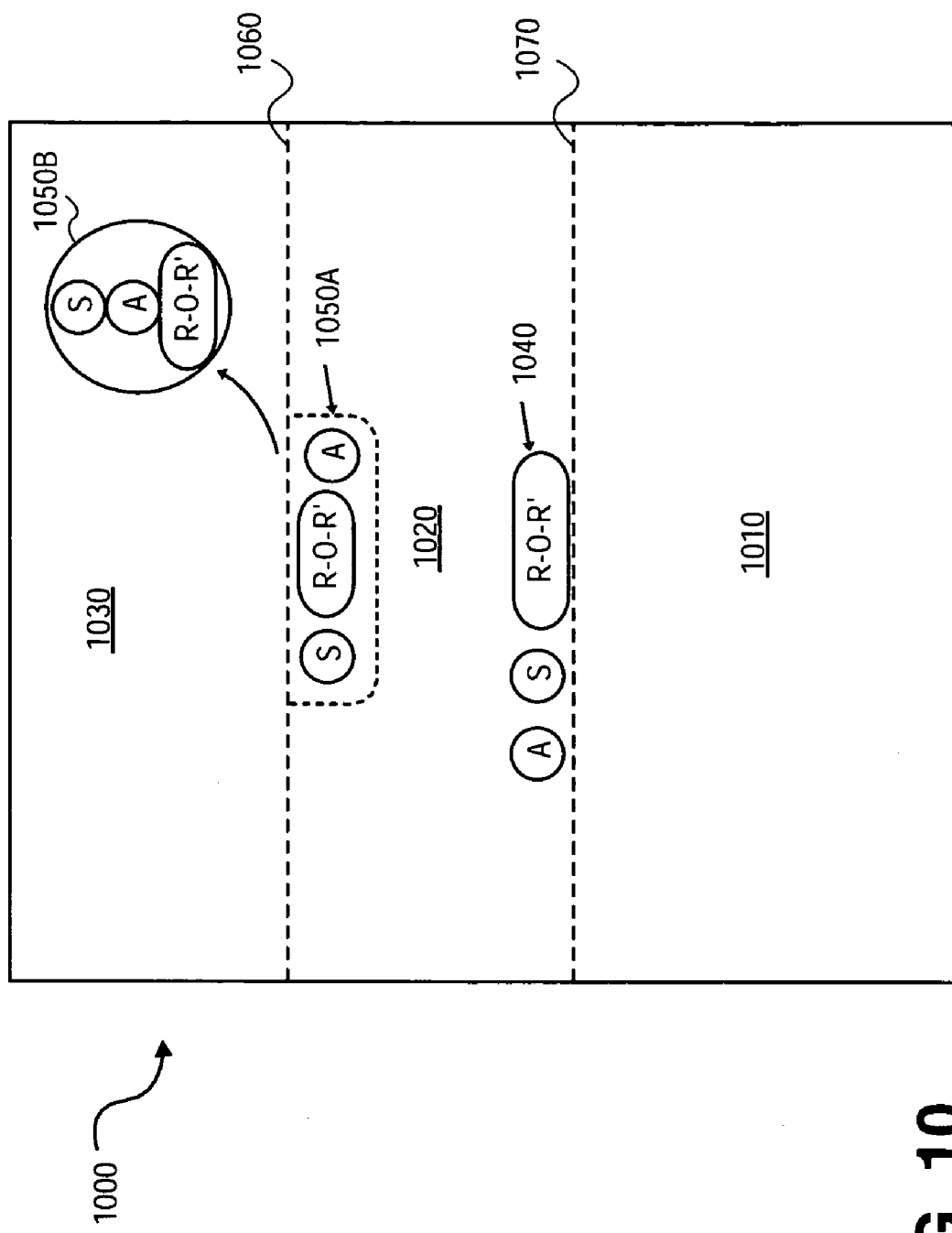
FIG. 10 illustrates a schematic diagram of improved recovery of difficult to recover oil with the use of a recovery composition.

FIG. 10 illustrates a recovery composition such as described above interacting with oil wetting sand, according to one embodiment. Sand 1010 is shown having an oil wetted thereto, the oil containing at least some of a recovery composition dissolved therein. A water flood 1030 is coupled with the oil 1020 to remove the oil from the sand. The water flood 1030 may be replaced by another motive fluid or by steam.

The sand and the oil meet at an oil-sand interface. Near the interface are an acid (A), a surfactant (S), and a fatty acid alkyl ester (R—O—R') of a recovery composition dissolved in the oil. It is believed that one or more of these composition components act as interfacial agents to reduce attractions and adhesions between the oil and the sand. This is conceptually represented as a dashed line 1070. Advantageously, this tends to make it easier to recover substantial portions of the oil.

The oil and the water flood meet at an oil-water interface. Near the oil-water interface are an acid, a surfactant, and a fatty acid alkyl ester of the dissolved recovery composition. One or more of these components may act as interfacial agents to reduce interfacial tension between the oil and the water. This is conceptually represented as a dashed line 1060. As shown, a portion 1050A containing some of the recovery composition may be dislodged and carried away typically as a droplet of oil 1050B dispersed in the water flood. In such a way the recovery composition may be used to improve recovery of oil.

Figure 11:
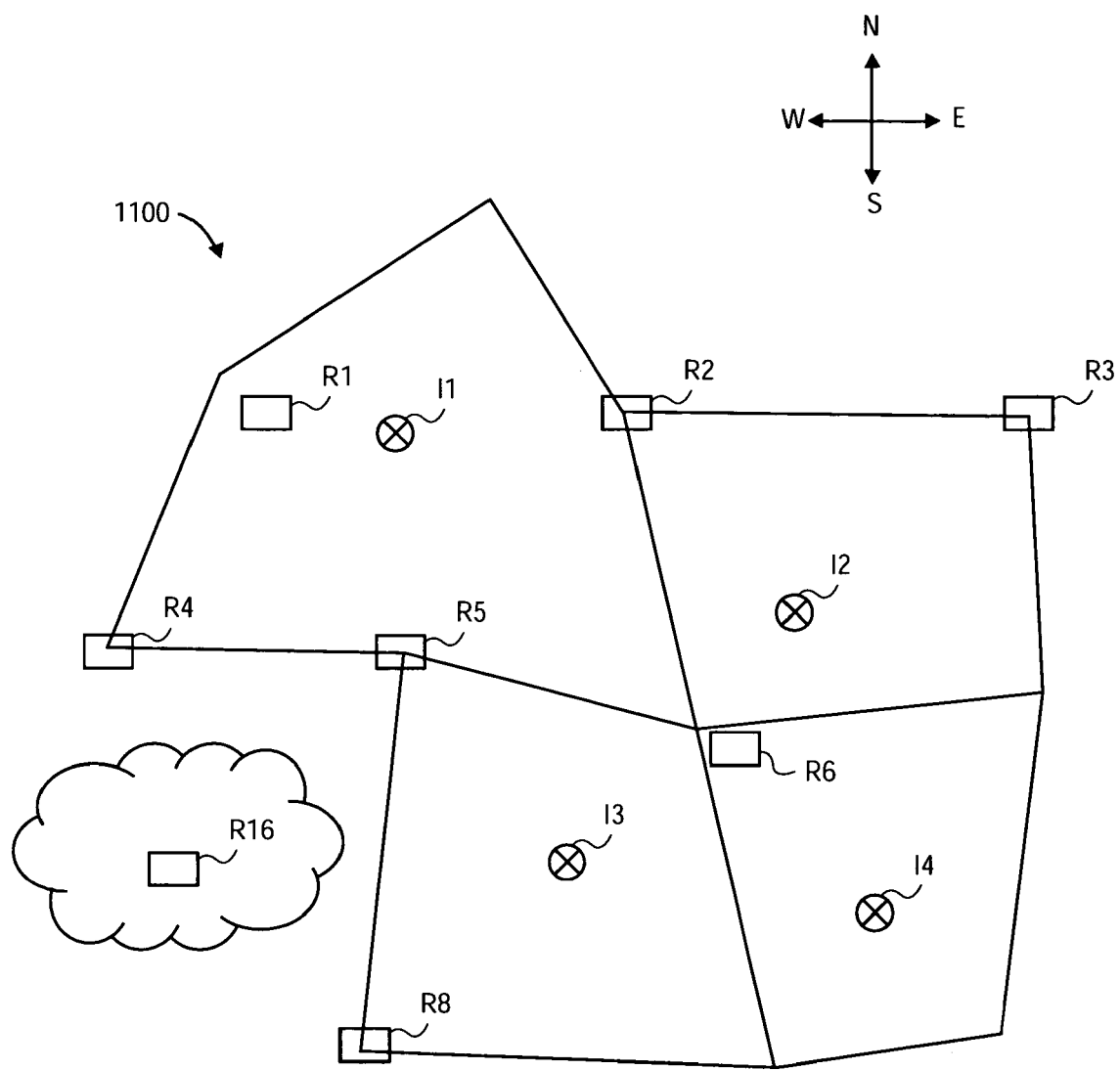
FIG. 11 illustrates a schematic top view of an exemplary oil reservoir field that was treated by an oil recovery composition, the top view showing positions of injection wells and recovery wells control sample of oil recovered from a control well of the exemplary oil reservoir shown in FIG. 11, the control sample not affected by the oil recovery composition injected into the oil reservoir.

Analysis of Oil Recovered from a Reservoir Treated with an Oil Recovery Composition FIG. 11 illustrates a top view of an exemplary oil reservoir field 1100 that was treated by an oil recovery composition of the present invention. The top view shows the positions of steam injection wells (I1, I2, I3, and I4) and recovery wells (R1, R2, R3, R4, R5, R6, R8, and control recovery well R16).

Recovery compositions containing about 96% soy methyl ester, about 3% F-500 surfactant, and about 1% vinegar were injected into the steam injection wells before oil samples were recovered from the recovery wells over approximately a three week period. In particular, injection well I1 was injected with 6700 gallons of recovery composition on a first date and five days later with an addition 5,300 gallons of the recovery composition; injection well I2 was injected with 7000 gallons of composition; injection well I3 was injected with 6000 gallons of the recovery composition and 6000 additional gallons of the recovery composition a day later; and injection well I4 was injected with 12000 gallons of the recovery composition. After injection of the compositions, steam was added to each of the injection wells to flush the composition from the lines and disperse the composition into the oil reservoir.

About four months after the first injection date, oil samples were recovered from each of the recovery wells and tested by gas chromatography. The oil sample collected from control recovery well R16 was not affected by the addition of the composition to the reservoir and serves as a control or benchmark for observing affects on the other oil samples due to addition of the composition.

Figure 12:
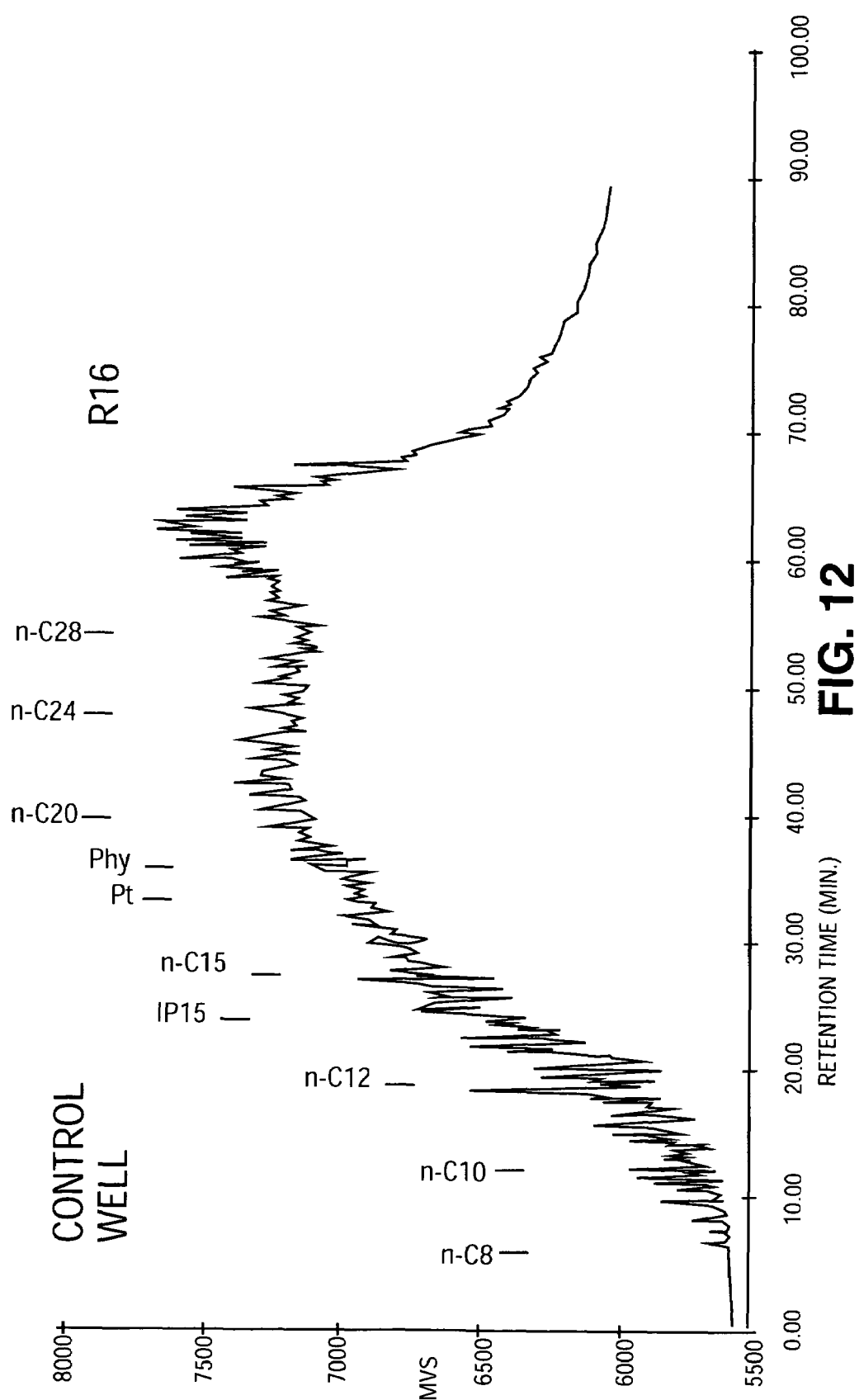
FIG. 12 illustrates exemplary gas chromatograph data for a sample of oil taken from well R16 as a control sample.
Figure 13A:
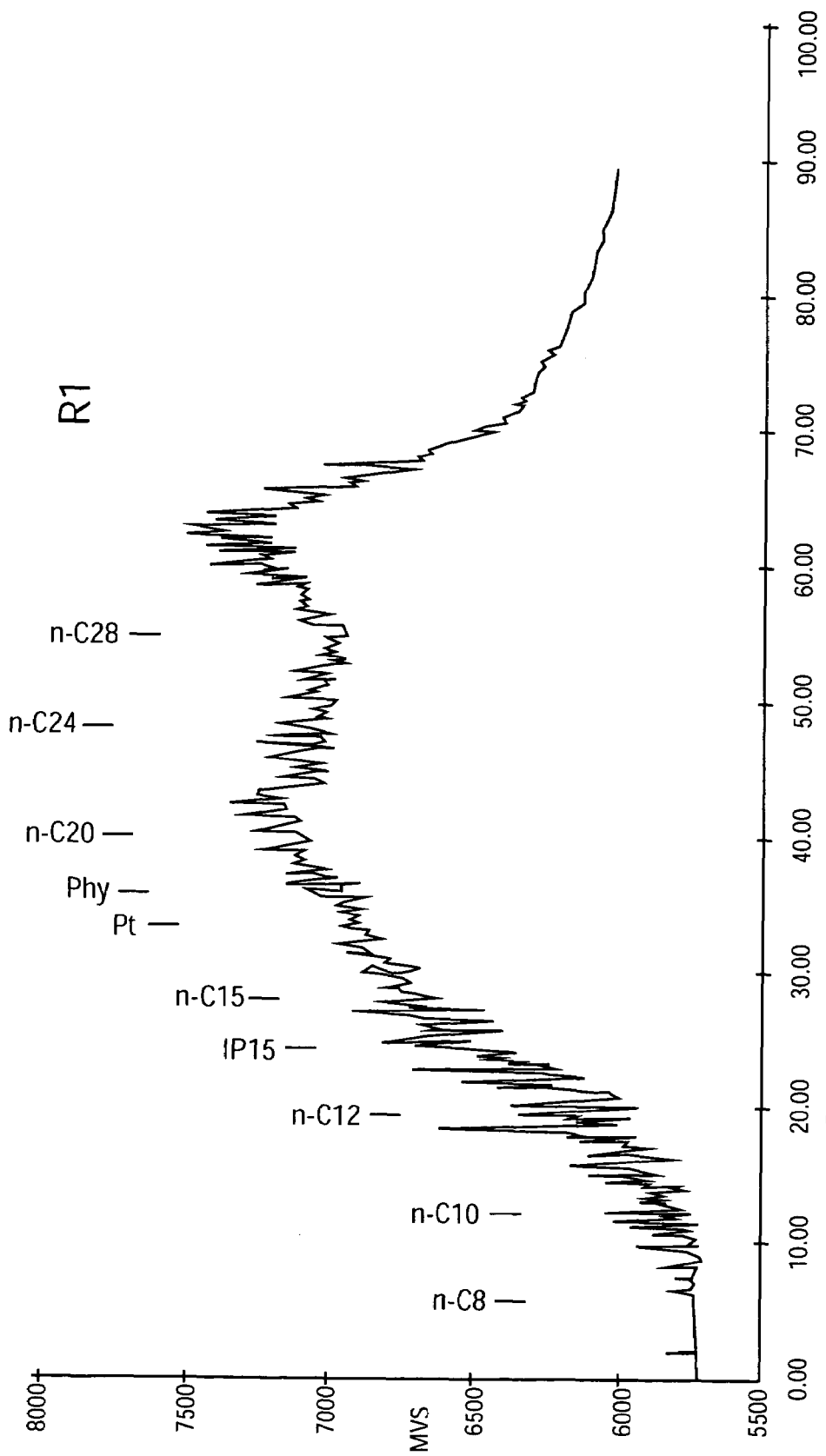
FIG. 13A illustrates exemplary gas chromatograph data determined for an oil sample that was collected from well R1 of the oil reservoir shown in FIG. 11.
Figure 13B:
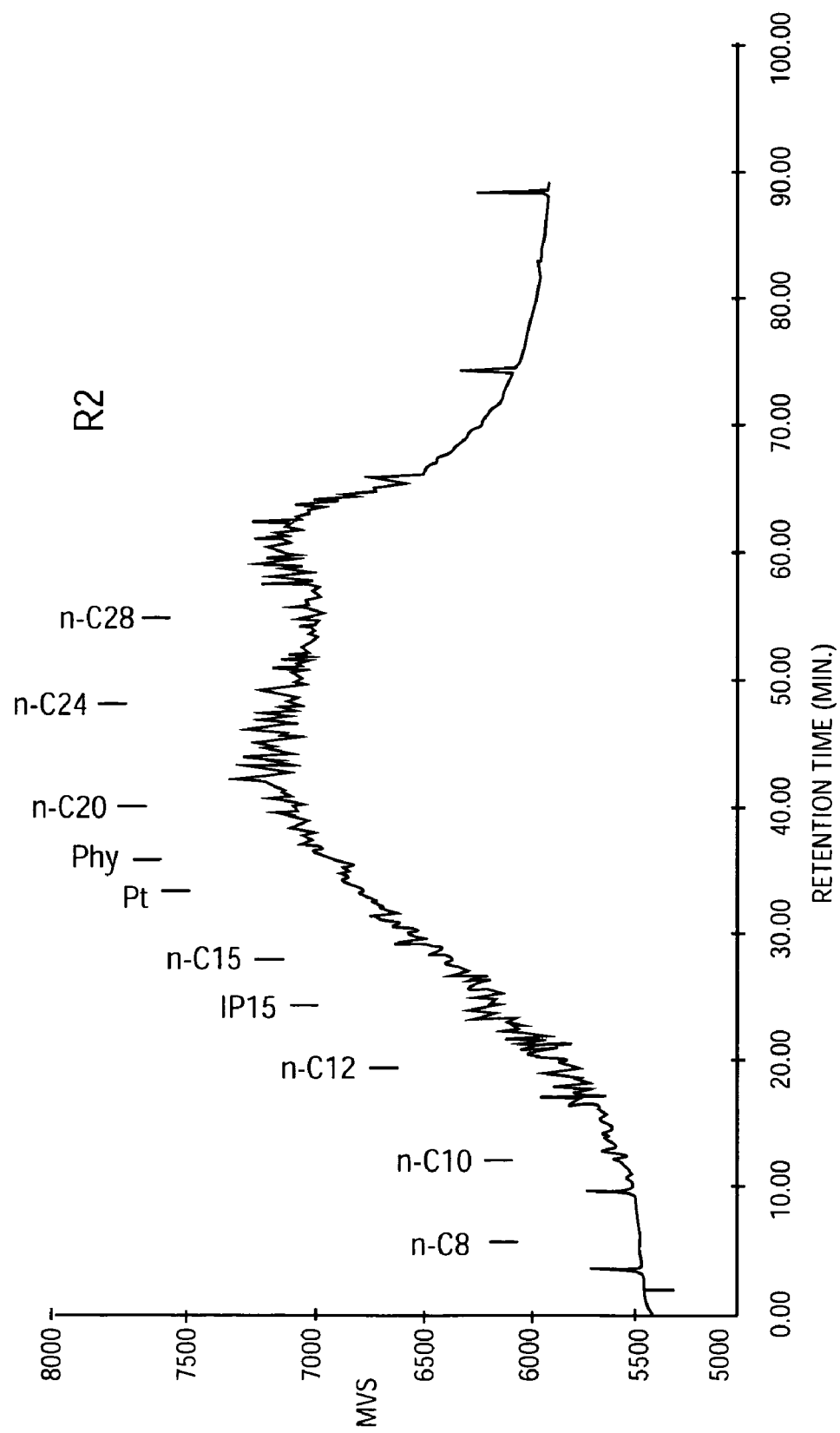
FIG. 13B illustrates exemplary gas chromatograph data determined for an oil sample that was collected from well R2 of the oil reservoir shown in FIG. 11.
Figure 13C:
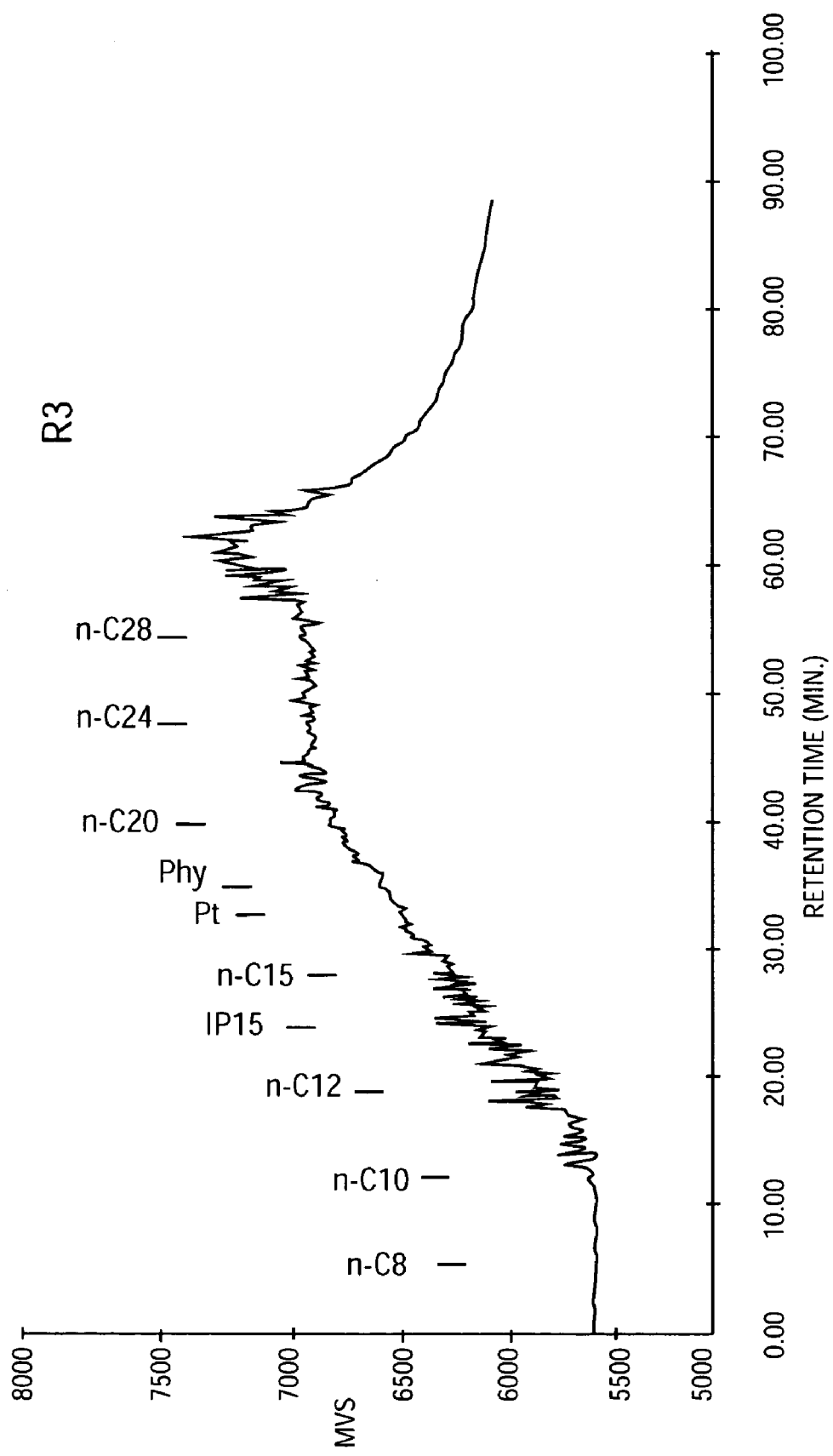
FIG. 13C illustrates exemplary gas chromatograph data determined for an oil sample that was collected from well R3 of the oil reservoir shown in FIG. 11.
Figure 13D:
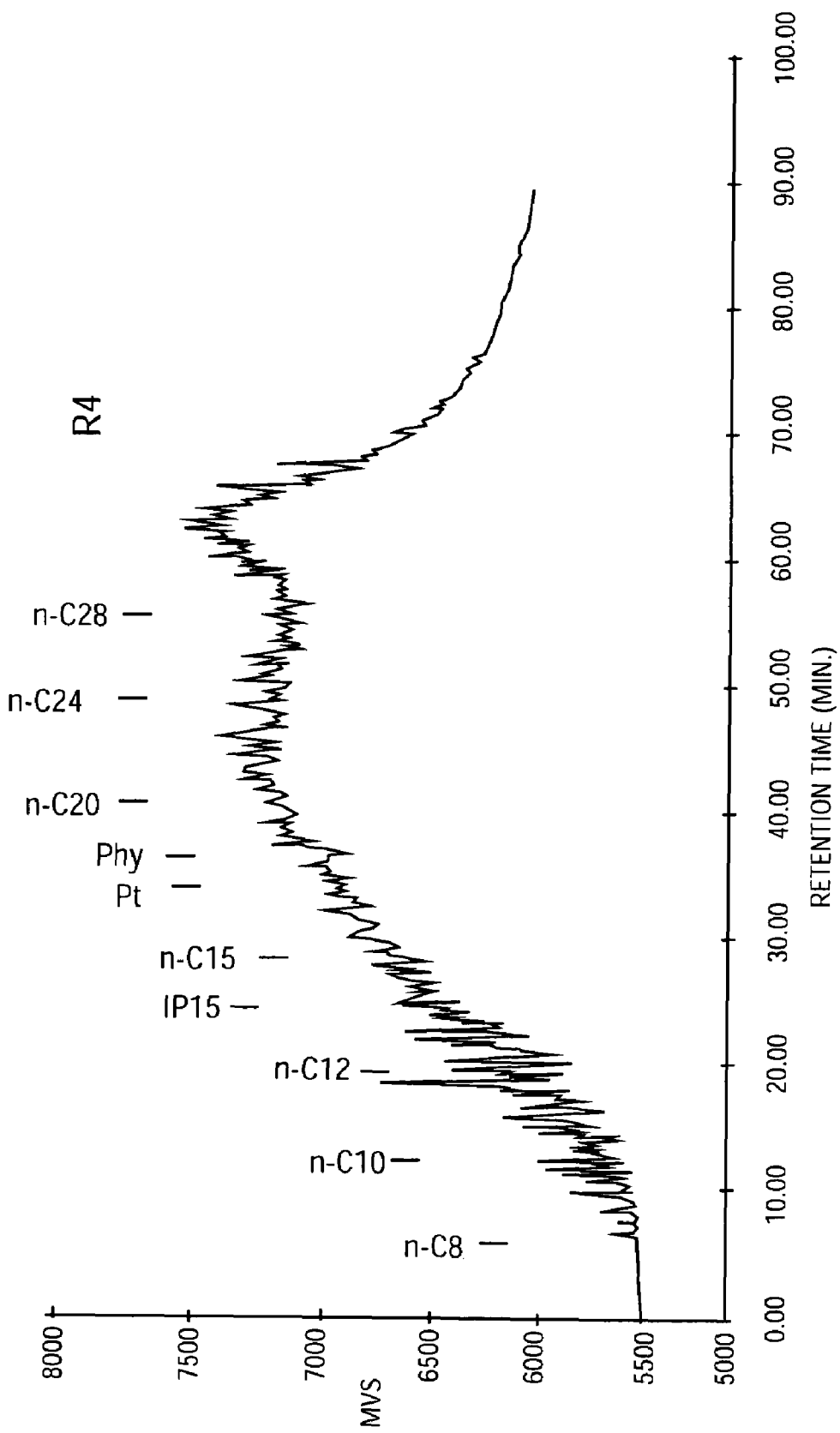
FIG. 13D illustrates exemplary gas chromatograph data determined for an oil sample that was collected from well R4 of the oil reservoir shown in FIG. 11.
Figure 13E:
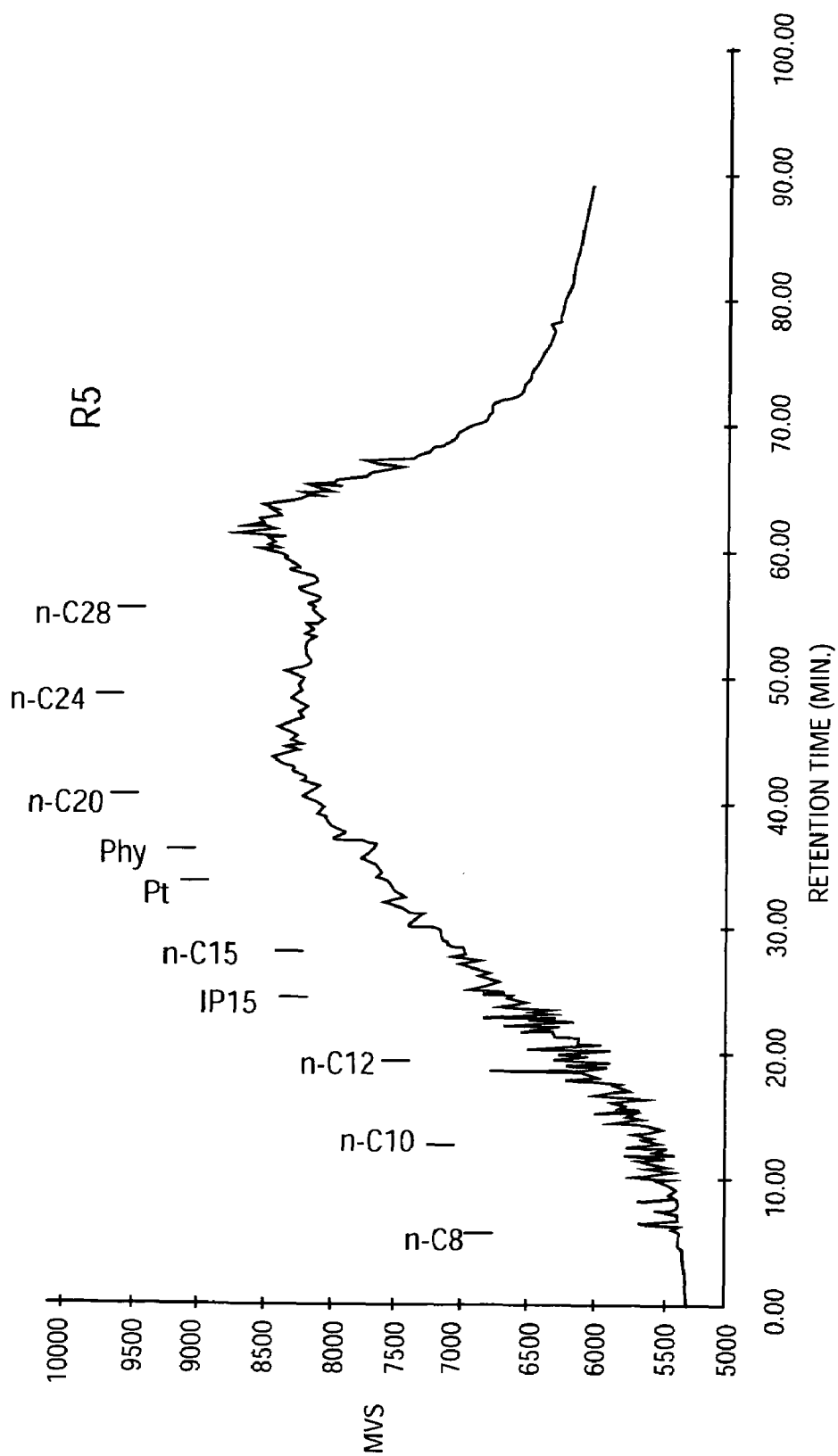
FIG. 13E illustrates exemplary gas chromatograph data determined for an oil sample that was collected from well R5 of the oil reservoir shown in FIG. 11.
Figure 13F:
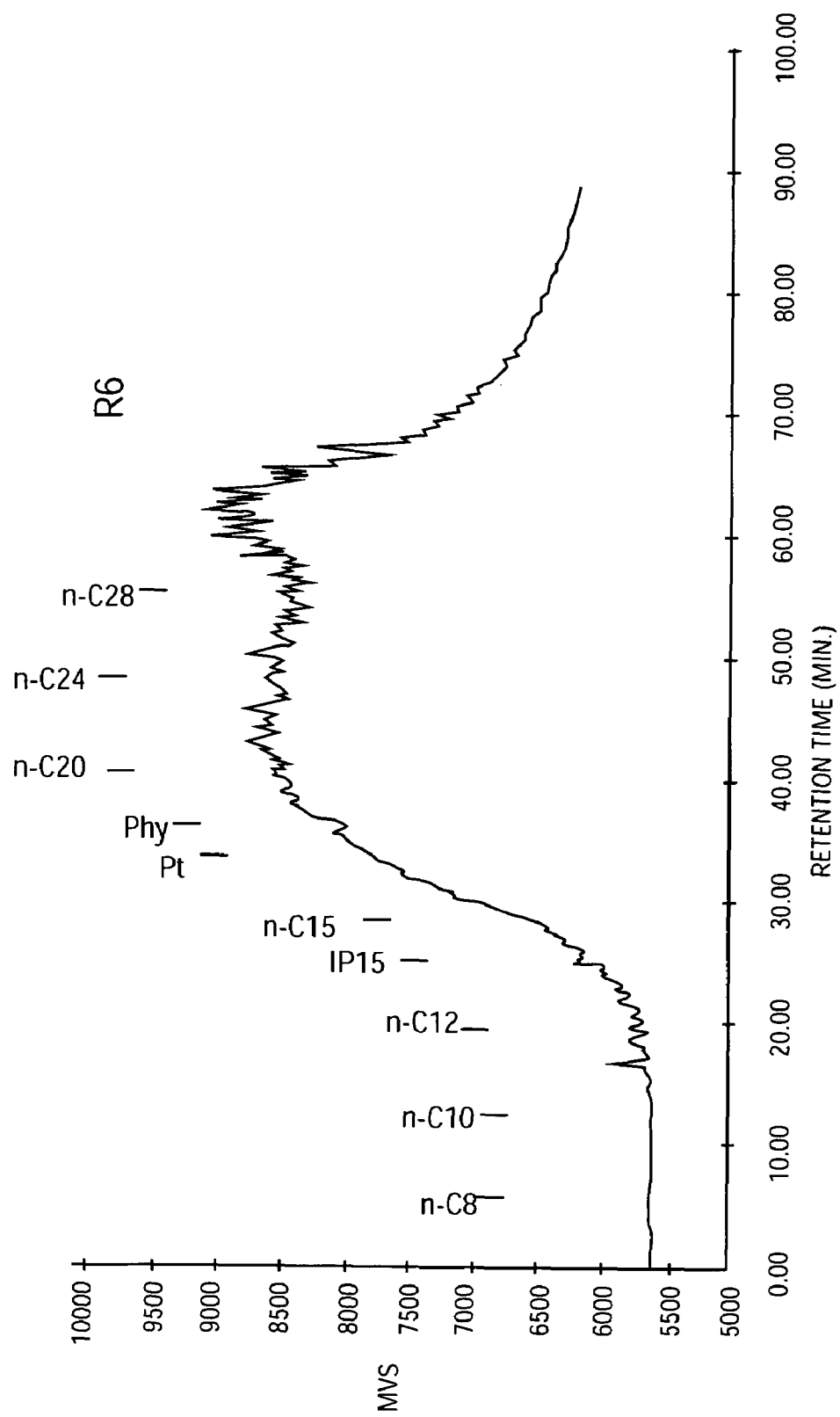
FIG. 13F illustrates exemplary gas chromatograph data determined for an oil sample that was collected from well R6 of the oil reservoir shown in FIG. 11.
Figure 13G:
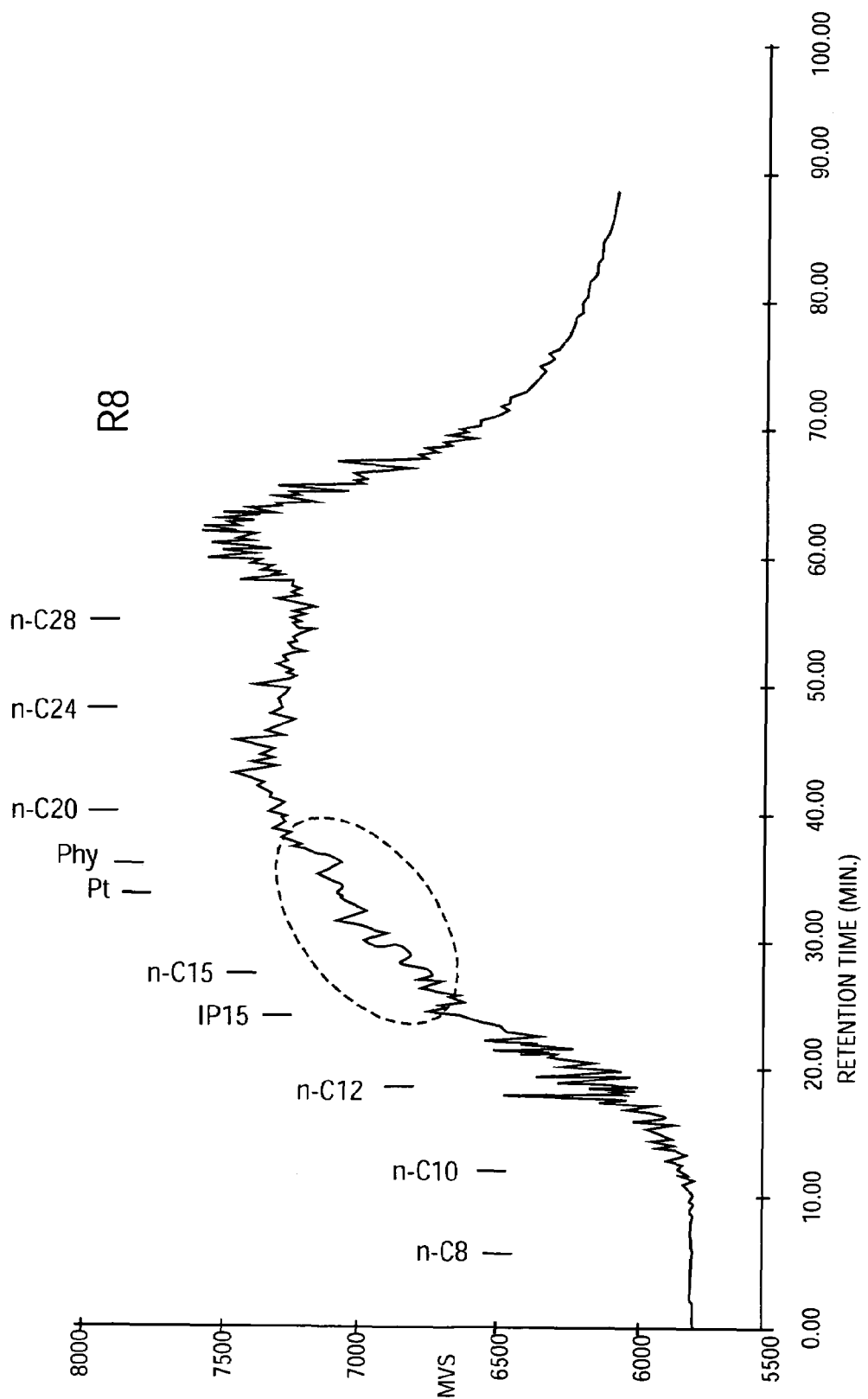
FIG. 13G illustrates exemplary gas chromatograph data determined for an oil sample that was collected from well R8 of the oil reservoir shown in FIG. 11.

FIG. 12 illustrates gas chromatographic data determined for the control sample and FIGS. 13A-13G show gas chromatographic data determined for samples from wells R1, R2, R3, R4, R5, R6, and R8, respectively. The gas chromatography data is an analytical representation of the different organic components in each oil sample. In particular, the position, shape, curvature, and roughness of the gas chromatography data line characterizes and represents the chemical composition of the oil sample. In this way the data acts as a fingerprint for the oil sample. In the absence of any affect by the composition, the gas chromatography data for each collected sample would be expected to be substantially identical within proximate oil wells on the same oil reservoir (i.e., similar to FIG. 12).

Comparison of the control sample shown in FIG. 12 with the non-control samples in FIGS. 13A-13G show a different result. Firstly, this data shows that the composition added to the reservoir has affected and altered the chemistry of oil samples recovered from recovery wells several hundred feet from an injection well. Accordingly, the compositions and methods described herein have been effective to disperse the composition over an effective distance of an oil reservoir. Secondly, this data shows that the composition has been effective in altering the oil chemistry and chemical properties. This is believed to be partly due to the fact that the composition has made previously unrecoverable viscous oil available and present in the sample, and partly due to the fact that the composition may react with certain oil components to change them chemically. Such changes are believed to aid in recovery of oil from the oil reservoir.

Alternate Uses if the Composition

The recovery compositions described herein have other uses. Several alternative uses are described below. Those having an ordinary level of skill in the art and the benefit of the disclosure will appreciate that still other uses are contemplated.

Cleaning Agent to Clean Oil Contaminated Soil

According to a first alternate embodiment, a recovery composition such as those described herein may be used to clean soil that is contaminated with oil. The recovery composition may assist with releasing the oil from the soil by weakening the physical and chemical attractions and attachments between the oil and the soil.

Figure 14:
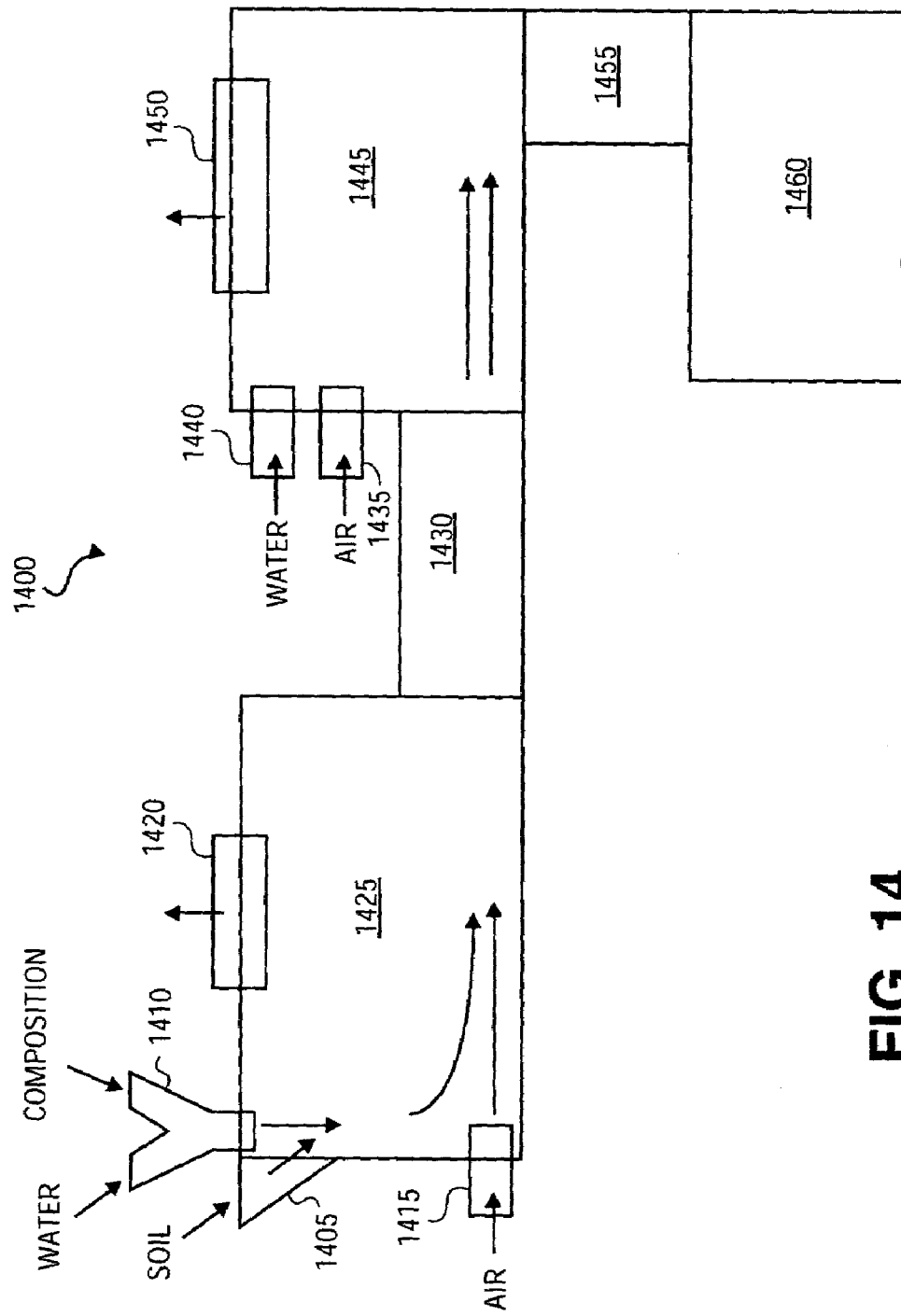
FIG. 14 illustrates a system for washing oil-contaminated soil with an oil recovery composition.

FIG. 14 illustrates a two-stage contaminated oil cleaning system 1400, according to one embodiment. The two-stage system includes a primary treatment vessel 1425 and a secondary treatment vessel 1445. The vessels may be enclosed processing tanks having design specifications consistent with the uses and conditions described below.

Soil contaminated with oil is added to the primary vessel via a soil hopper 1405. Water and a soil-washing composition are mixed and added to the primary vessel via a water inlet 1440. The water is pressurized water and may be heated between about 100° F. to about 200° F. or between about 110° F. and about 130° F. Enough water may be added to provide a good flush of the soil through and from the system including the vessels. The composition may be added in a ratio to the soil of about 0.01 to about 10 or between about 0.1 and about 2. The composition may comprise 80(±6)% soy methyl ester, 18(±5)% TWC210 or similar colloid, and 2(±1)% vinegar. Alternatively, other compositions described herein may be used instead. The primary vessel may be an elongated vessel having a long side along which the soil may travel from an entrance end at the inlets to an opposite end. The water inlet and hopper may be located on or proximate the entrance side. The water inlet and the hopper may additionally be located proximate one another towards a top of the primary vessel and aligned so that the water directs and mixes the soil downward due to its velocity.

Compressed air may be added to the primary vessel via an air inlet 1415. The air may be added in an amount sufficient to agitate the primary vessel contents including enough to mix the soil and the water-composition mixture. The air inlet may direct the air in a direction along a longest side of the vessel so as to encourage the water and soil in the tank to move in this direction. According to one embodiment at least some of the air is added upward along the length of the bottom of the vessel to encourage soil not to settle and pack, which may decrease the washing efficiency. Spent air may exit the vessel through a spent air treatment system 1420, which may include a venturi and air scrubber.

The soil and water move across the tank, from the entrance at the left to an exit at the right, and is removed from the primary vessel by a pumping system 1430. The primary vessel may have a size sufficient to provide an effective residence time for the composition and water to wash the soil. The residence time may be between about 1 minute and 5 hours or preferably between about 5 minutes and 1 hour. The water and the soil washing composition loosen and remove an effective amount of the oil from the soil. The removed oil and the composition may separate from the water as droplets within the water and may rise to an oil layer at the top of the primary vessel. According to one embodiment, this layer is skimmed, pumped, or otherwise removed from the primary vessel for further processing.

A pumping system 1430 pumps the soil and water to a secondary treatment vessel 1445. The pumping system may comprise a gravel pump. The secondary vessel may be substantially as described for the primary vessel or may be different as desired. The soil mixture may enter the secondary vessel at a left hand entrance (as viewed) and travel from left to right along a longest length of the vessel to an exit side at the left. Water may be added via a water inlet 1440 to assist with movement of the soil and air may be added via an air inlet 1435 to assist with agitation of the vessel contents. The spent air may leave through a spent air treatment system 1450. Phase separated oil and composition may be skimmed and recovered from the secondary vessel or pumped out with the water for subsequent processing and recovery.

A pumping system 1455 removes water and soil from the secondary vessel at an opposite side from its inlet and pumps it to a dewatering system 1460. The dewatering system may comprise a dewatering means such as a large settling tank, shaker pit to shake out solids, a centrifuge, or some combination.

Spill Control Agent to Treat Oil Spills

According to a second alternate embodiment, the recovery composition describe herein may be used as oil spill agent to recover or remove oil from an oil spill. The recovery composition may be used to coat surfaces before contacted with the oil spill or to weaken bonds between oil and surfaces after they have been coated with oil.

A first method for recovering or removing oil from an oil spill may include: (1) spraying or otherwise applying an effective amount (e.g., between about 0.01-1 gallon per square foot or preferably between about 0.1 gallons per square foot depending upon the amount of oil) of the recovery composition on environmental surfaces (e.g., rocks, sand, beaches, piers, boat docks, etc) that have been coated by oil from a spill, (2) allowing sufficient time for the composition to loosen the bonds between the oil and the soil (e.g., between about one minute and one day or preferably between about 0.5-2 hours, (4) spraying water on the soil to remove the oil from the soil, (5) collecting the removed oil, and (6) repeating (1)-(5) zero or more times until the oil has been removed to a desired extent.

A second method may include spraying or otherwise applying the recovery composition on surfaces before they are coated with oil to make the surfaces less susceptible to strong coating attachment by the oil. For example, following an oil spill on the sea a proximate beach may be sprayed with an effective amount of the recovery composition (e.g., about 0.1 gallons per square foot) before the oil spill reaches the beach to prevent the approaching oil spill from adhering strongly to the surfaces. Advantageously, this may reduce the impact of the spill as well as making remediation easier and less costly.

The exemplary composition mentioned above for cleaning oil contaminated soil is also contemplated to be useful for this embodiment. Other compositions and methods are contemplated and will be apparent to a person having an ordinary level of skill in the art and the teachings of the present disclosure.

Clarifying Agent to Improve Solids Separation

According to a third alternate embodiment, the recovery composition described herein may be used to improve separation of solids from oil and water. For example, the recovery composition may be added to production oil or water pumped from the well to release solids suspended by the oil or water by weakening the attractions between the solids and the fluids. The recovery composition may reduce bonding between the solids and the fluids and allow them to separate by gravity. This may allow the oil and water to pass though to the production process with significantly reduced solids. Advantageously, this may reduce wear to processing equipment such as pumps and valves. This may also allow the solids to be recovered cleaner from knockouts and tanks than is possible by current methods involving polymers. Advantageously, such cleaner solids may be considered less hazardous materials for purposes of disposal, storage, or treatment.

A method for improving solids separation with the recovery composition may include: (1) adding an effective amount of a recovery composition, e.g., between about 0.01-0.1 gallons per gallon of fluid, to a process fluid (e.g., oil or water pumped from the well), (2) allowing sufficient contact (e.g., sufficient mixing within a valve or sufficient time within a tank or other high residence time equipment) to allow the recovery composition to contact the suspended solids, (3) allowing sufficient time for the composition to loosen the bonds between the oil and the soil and for the suspended solids to settle (e.g., between about one minute and one day or preferably between about five minutes and one hour depending upon the size of the density and size of the solids and the viscosity of the oil, and (4) conventionally processing the separated fluids and solids.

An example recovery composition that is contemplated to be useful for this embodiment includes 90(±5)% soy methyl ester and 10(±5)% TWC210 colloid. Acid may not be needed to provide suspension of the colloid since the composition may remain thoroughly mixed by flow, pumping, and similar means. Additionally, the composition may remain mobile rather than stagnant, which would promote separation. Other compositions and methods are contemplated and will be apparent to a person having an ordinary level of skill in the art and the teachings of the present disclosure.

Cleaning Agent to Remove Organic Fouling

According to a fourth alternate embodiment, the recovery composition may be used as a cleaning agent to remove oil component fouling from oil processing equipment. The recovery composition may also be used to clean the inside or outside of oil processing equipment such as knock out tanks, storage tanks, production lines, pipes, valves, pumps, and other processing equipment in order to remove oil component fouling such as organic residue, hydrocarbon fouling, or cake. Advantageously, the recovery composition may be more compatible with the refining process than other cleaning agents such as acids. The composition and in particular the surfactants may also aid in reducing $H_2S$ levels.

A method for removing oil component fouling from an evacuated tank (e.g., a knock out tank or oil storage tank) may include: (1) spraying or otherwise applying an amount of the recovery composition sufficient to coat the surface of the tank (e.g., typically less than about 0.01 gallons per square foot of tank, (2) allowing sufficient time for the composition to loosen the bonds between the fouling and the tank (e.g., between about 1 minute and 1 day or preferably between about 0.5-2 hours, (4) spraying water preferably a high pressure stream of water on the tank to remove the fouling and the recovery composition from the tank, (5) disposing of the removed fouling and composition, and (6) repeating (1)-(5) zero or more times until the tank has been cleaned to a desired extent.

A method for removing fouling from less accessible processing equipment such as production lines, pumps, and valves is also contemplated. Depending upon the particular implementation pure composition or solutions (e.g., diluted with water) of the recovery composition may be circulated through the processing equipment. Advantageously, this may be used to remove oil fouling such as paraffin and asphalt deposits from such inaccessible processing equipment.

An example recovery composition that is contemplated to be useful for this embodiment includes 80(±8)% soy methyl ester, 5(±2)% F-500 surfactant, 13(±5)% TWC210 colloid, 2(±1)% vinegar. Other compositions and methods are contemplated and will be apparent to a person having an ordinary level of skill in the art and the teachings of the present disclosure.

Graffiti Cleaning Agent to Remove Graffiti

According to a sixth alternate embodiment, a similar recovery composition and method as described above to remove fouling may be used to remove oil-based paint or graffiti from surfaces. A similar recovery composition may also be used to remove oil components from cement, such as parking garage floors.

Bio-compatible Cleaning Agent for Oil Coated Wildlife

According to a fifth alternate embodiment, the recovery composition may be used to clean wildlife such as birds and animals that are contaminated by oil, such as by an accidental oil spill. The recovery composition may weaken the bonds between feathers, fur, and skin and the oil. Advantageously, this may reduce the impact of the spill on the wildlife and may allow cleaning the wildlife with a non-toxic, non-irritating, and biodegradable agent.

A method for cleaning wildlife may include: (1) restraining the wildlife such as by hand or within a cage, (2) spraying or otherwise applying an amount of the recovery composition sufficient to coat the surface of the wildlife (e.g., less than about one gallon or preferably less than about 0.1 gallon per animal the size of a normal ptarmigan), (3) massaging the recovery composition into contact with the animals fur or features, (4) allowing sufficient time for the composition to loosen the bonds between the oil and the fur or feathers (e.g., between about thirty seconds and about one hour or preferably less than about ten minutes, (5) gently spraying water on the wildlife to remove the oil and the recovery composition from the fur or feathers, and (6) repeating (2)-(5) zero or more times until the wildlife has been cleaned to a desired extent.

An example composition that is contemplated to be useful for this embodiment includes 90(±5)% soy methyl ester, 8(±4)% lanoline, and 2(±1)% aloe vera. These components and concentrations may be replaced with other non-toxic and non-irritating components and concentrations. For example, the lanoline may be replaced by another surfactant used in cleaning agents for humans such as bath soaps, shampoos, and cleaners that are sufficiently mild for humans. Other compositions and methods are contemplated and will be apparent to a person having an ordinary level of skill in the art and the teachings of the present disclosure.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A composition comprising:
    at least 85 percent of a fatty acid alkyl ester;
    at least one of a surfactant and a colloid; and
    an acid,
    wherein the fatty acid alkyl ester is an ester derived from a vegetable triglyceride, and
    wherein the surfactant comprises a composition comprising 2,2'2"-Nitrilotrisethanol aliphatic acid soap, fatty alkyl ethers reaction product with aliphatic acids, and linear aliphatic alcohols; and
    wherein the acid is selected from the group consisting of: a carboxylic acid, acetic acid, formic acid, citric acid, carboxylic acid, butyric acid, benzoic acid, carbonic acid, an aqueous solution of an acid, vinegar, and a mineral acid.

2. The composition of claim 1, wherein the fatty acid alkyl ester comprises a mixture of sixteen carbon chain length methyl esters, seventeen carbon chain length methyl esters, and eighteen carbon chain length methyl esters.

3. The composition of claim 2, wherein the mixture comprises alkyl esters of linoleic acid, oleic acid, stearic acid, and palmitic acid.

* * * * *